United States Patent
Rao et al.

(10) Patent No.: US 12,511,650 B2
(45) Date of Patent: Dec. 30, 2025

(54) ONLINE DECENTRALIZED IDENTITY VERIFICATION FOR A MULTI-SIDED NETWORK

(71) Applicant: PayPal, Inc., San Jose, CA (US)

(72) Inventors: Anita Paul Rao, Cupertino, CA (US); Sargis Dudaklyan, Sylmar, CA (US); Matt Wyman, Los Angeles, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/421,290

(22) Filed: Jan. 24, 2024

(65) Prior Publication Data

US 2024/0202715 A1    Jun. 20, 2024

Related U.S. Application Data

(63) Continuation of application No. 17/660,231, filed on Apr. 22, 2022, now Pat. No. 11,922,410, which is a
(Continued)

(51) Int. Cl.
*G06Q 20/00*     (2012.01)
*G06Q 20/38*     (2012.01)
(Continued)

(52) U.S. Cl.
CPC ..... *G06Q 20/3823* (2013.01); *G06Q 20/3829* (2013.01); *G06Q 20/4014* (2013.01); *H04L 9/3213* (2013.01); *H04L 2209/56* (2013.01)

(58) Field of Classification Search
CPC ........... G06Q 20/3823; G06Q 20/3829; G06Q 20/4014; G06Q 20/02; G06Q 20/363;
(Continued)

(56) References Cited

U.S. PATENT DOCUMENTS

2009/0328175 A1* 12/2009 Shuster ................. H04L 9/3226
726/7
2013/0097684 A1    4/2013 Kim
(Continued)

FOREIGN PATENT DOCUMENTS

ES         2599985 T3     2/2017
SG      11202005536 T     7/2020
(Continued)

OTHER PUBLICATIONS

Abraham A., et al., "Revocable and Offline-Verifiable Self-Sovereign Identities," 2020 IEEE 19th International Conference on Trust, Security and Privacy in Computing and Communications (TrustCom), 2020, pp. 1020-1027.
(Continued)

*Primary Examiner* — Dante Ravetti
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to facilitating secure communication of private user data between different entities for a verification process conducted during an electronic interaction between the user and a verifier entity. In disclosed embodiments, a verification service executing on a server computer system for a verification session for verifying a holder entity on behalf of a verifier entity receives a verification request from a remote computer system. The verification request includes an attestation proof generated from one or more credentials and the verification service communicates with a holder service that manages an identity storage storing credentials for the holder entity. The verification service transmits, to the verifier service, the attestation proof and then receives, from the verifier service based on the proof, verification results that are usable by the
(Continued)

verifier to determine whether to process an action requested by the holder prior to requesting verification.

20 Claims, 16 Drawing Sheets

Related U.S. Application Data continuation-in-part of application No. 17/651,164, filed on Feb. 15, 2022.

(51) Int. Cl.
*G06Q 20/40* (2012.01)
*H04L 9/32* (2006.01)

(58) Field of Classification Search
CPC .............. G06Q 50/265; H04L 9/3213; H04L 2209/56; H04L 9/3247; H04L 63/0807; H04L 63/0823; H04L 63/10; H04L 9/50
USPC ................. 705/16, 21, 59; 380/44, 262, 278
See application file for complete search history.

(56) References Cited

U.S. PATENT DOCUMENTS

| | | |
|---|---|---|
| 2016/0182497 A1 | 6/2016 | Smith |
| 2017/0109759 A1 | 4/2017 | Korb |
| 2018/0227131 A1 | 8/2018 | Ebrahimi et al. |
| 2019/0188580 A1 | 6/2019 | Rao et al. |
| 2019/0188805 A1 | 6/2019 | Rao |
| 2019/0230092 A1 | 7/2019 | Patel et al. |
| 2019/0305952 A1 | 10/2019 | Hamel et al. |
| 2019/0370847 A1 | 12/2019 | Khan |
| 2019/0392071 A1 | 12/2019 | Rao et al. |
| 2020/0195436 A1 | 6/2020 | Khan |
| 2020/0220726 A1 | 7/2020 | Lougheed, III et al. |
| 2020/0274713 A1 | 8/2020 | Li et al. |
| 2020/0374132 A1 | 11/2020 | Lobban et al. |
| 2021/0218574 A1 | 7/2021 | Mao et al. |
| 2021/0352083 A1 | 11/2021 | Oberhauser et al. |
| 2022/0029807 A1 | 1/2022 | Ebrahimi |
| 2022/0108008 A1 | 4/2022 | Bronk et al. |
| 2023/0051854 A1 | 2/2023 | Manian et al. |
| 2023/0075539 A1 | 3/2023 | Pohjola et al. |
| 2023/0316261 A1 | 10/2023 | Agbamu |
| 2023/0377700 A1 | 11/2023 | Andreina et al. |
| 2024/0146537 A1 | 5/2024 | Sakamoto et al. |

FOREIGN PATENT DOCUMENTS

| | | |
|---|---|---|
| WO | 2019118940 A1 | 6/2019 |
| WO | 2023233173 A1 | 12/2023 |

OTHER PUBLICATIONS

Ferdous M.S., et al., "In Search of Self-Sovereign Identity Leveraging Blockchain Technology," IEEE Access, Aug. 12, 2019, vol. 7, pp. 103059-103079.

International Preliminary Report on Patentability for Application No. PCT/US2023/062173, mailed on Aug. 29, 2024, 12 pages.

Lux Z.A., et al., "Distributed-Ledger-Based Authentication with Decentralized Identifiers and Verifiable Credentials," 2020 2nd Conf on Blockchain Research & Applications for Innovative Networks and Services (BRAINS), 2020, 8 pages.

Siddiqui H., et al., "Credentials as a Service Providing Self Sovereign Identity as a Cloud Service Using Trusted Execution Environments," 2021 IEEE International Conference on Cloud Engineering (IC2E), 2021, pp. 210-216.

Tatschner S., et al., "The Stream Exchange Protocol: A Secure and Lightweight Tool for Decentralized Connection Establishment," Sensors, Jul. 21, 2021, vol. 21, No. 4969, 20 pages.

Yildiz H., et al., "Connecting Self-Sovereign Identity with Federated and User-centric Identities via SAML Integration," 2021 IEEE Symposium on Computers and Communications (ISCC), 2021, 7 pages.

Anderson R., "Chapter 1: What Is Security Engineering, A Guide to Building Dependable Distributed Systems," 2nd Edition, Apr. 14, 2008, 14 pages.

International Search Report and Written Opinion for Application No. PCT/US2023/062173 mailed on Jun. 22, 2023, 19 pages.

Machine Translation of ES2599985T3, Feb. 6, 2017, 36 pages.

Office Action for U.S. Appl. No. 17/660,231 mailed on Aug. 17, 2023, 19 pages.

Ross R.S., et al., "Systems Security Engineering: Considerations for Multidisciplinary Approach in the Engineering of Trustworthy Secure Systems," National Institute of Standards and Technology, Nov. 2016, 261 pages.

Wikipedia., "Security Engineering," Retrieved from Internet URL: https://en.wikipedia.org/w/index.php?title=Security_engineering &oldid=1017168910, last edited on Apr. 11, 2021, 5 pages.

\* cited by examiner

Example Verification
Session Initiation
1200

Holder Device 1250

User Interface 1252

To complete this transaction, the verifier entity
needs to verify your identity. Please accept the
verification invitation to proceed.

Accept Verification Invitation

Example Verification Result 1206

Holder Device 1250

User Interface 1258

Verification Successful!

Confirm Transaction

Method
1300

Receive, for a verification session for verifying a holder entity on behalf of a verifier entity, a verification request from a remote computer system, the verification request including an attestation proof generated from one or more credentials, where the verification service communicates with a holder service that manages an identity storage that stores the one or more credentials for the holder entity.
1310

Transmit, to a verifier service, the attestation proof.
1320

Receive, from the verifier service based on the transmitted attestation proof, verification results, where the verification results are usable by the verifier entity to determine whether to process an action requested by the holder entity prior to initiating the verification session.
1330

*Fig. 13*

ONLINE DECENTRALIZED IDENTITY VERIFICATION FOR A MULTI-SIDED NETWORK

CROSS REFERENCE TO RELATED APPLICATION

The present invention is a Continuation of U.S. patent application Ser. No. 17/660,231, filed Apr. 22, 2022, which is a continuation-in-part of U.S. patent application Ser. No. 17/651,164, filed Feb. 15, 2022, the disclosures of which are incorporated herein by reference in their entirety.

BACKGROUND

Technical Field

This disclosure relates generally to data privacy, immutability, access, interoperability, portability, existence, security, and, more specifically, to techniques for secure transmission and verification of sensitive user data between entities.

Description of the Related Art

Centralized identity agencies such as credit card bureaus, insurance agencies, housing lenders, online-transaction processing systems, universities, etc. request and store sensitive user information for large numbers of individuals as information from these users is obtained over time. For example, a housing lender may request legal documentation from a user applying for a home loan (e.g., a driver's license, bank statements, credit statements, etc., or any portions thereof). Although the housing lender may only need this information for a short period of time (e.g., 30 days), this lender ultimately obtains access to this information indefinitely when the user provides it at the beginning of an application process.

BRIEF DESCRIPTION OF THE DRAWINGS

FIG. 13 is a flow diagram illustrating a method for verifying a holder entity on behalf of a verifier entity for an action requested by the holder entity, according to some embodiments.

DETAILED DESCRIPTION

Figure 1:
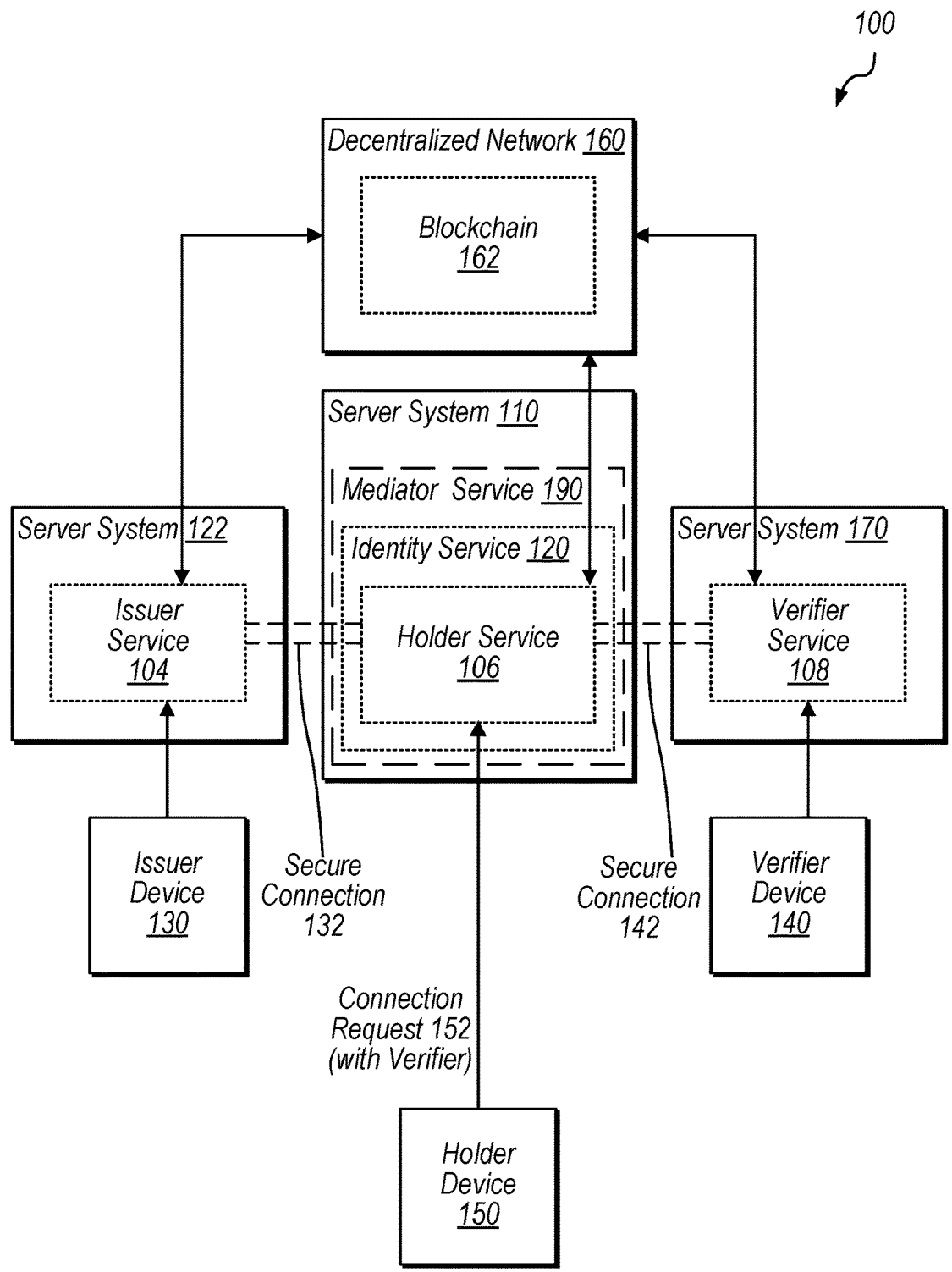
FIG. 1 is a block diagram illustrating an example trust system, according to some embodiments.

Traditionally, centralized identity agencies (e.g., credit card bureaus, insurance companies, housing lenders, housing businesses, online-transaction processing systems, merchants, etc.) store identification information for many individuals. Such platforms, however, are often easily hacked, leading to identity theft. In addition, users tend to share more than the necessary amount of private information with such agencies by providing an entire physical or digital copy of a document, instead of a small portion of the document (e.g., an ID, legal documents, etc.) that includes the necessary information requested by the agency (e.g., a driver's license number). As another example, many online platforms, including social media applications, email applications (Gmail™), etc. allow users to use their account credentials to authenticate themselves at other online platforms (e.g., an online merchant); however, these online platforms are then able to track the activity of these users at the other online platforms (e.g., gathering information about the user's online habits), thereby providing the online platforms with more information than intended or desired by the user. In addition to having access to private user activity, if these online platforms are compromised then this private user activity may become available to a malicious entity. In such situations, an individual user no longer has control over their information. As another example, if an online entity needs to verify the age of a user and the user provides the entity with an image of their driver's license, then the entity can see the address, full name, the user's birth date, expiration date of the license, the country/state in which the license was issued, etc. In many situations, it may be desirable for a user to share less than all of this information, particularly electronically as it may be hacked, duplicated, distributed, etc. without any input from the individual user.

The disclosed techniques provide information security including prevention of identity theft via the use of a blockchain in addition to providing a minimal set of user information required for verification. For example, the disclosed techniques provide only the information necessary to satisfy the requirements of a given entity requesting credentials from a user. Specifically, the disclosed identity service provides the smallest amount of private user data when satisfying a verification of the user requested by a verifier entity (e.g., an employer verifying a diploma of a potential new hire). This is accomplished by storing private user data in a secure wallet of the user on their device using cryptography and utilizing a publicly or privately available blockchain to provide a way for entities to verify a minimal set of user data shared with them. Such techniques may render third-party login services unnecessary as blockchain allows for the verification of user credentials. In this way, the user (holder) has full control over whom and to what extent they would like to share their information. In the example of the driver's license above, the disclosed techniques allow a user to share only their name, age and picture with a verifier entity. The verifier entity can confirm the authenticity of this information by checking the blockchain (where an issuer of the driver's license has stored a decentralized identifier (DID)) to ensure that the driver's license was indeed issued by a valid issuer and has not been revoked. For example, when issuing the driver's license, the issuer previously registers itself on the blockchain with a DID, a DID document (DDO), the definition and schema of the verifiable credentials to be issuers (i.e., the driver's license), and the issuer entity's endpoints on the blockchain. The issuer entity also publishes their DID to a governance body, which later is used to verify authenticity of the issuer entity. For example, the governance body may confirm for various holder and verifier entities that an issuer entity is indeed a department of motor vehicles that is issuing credentials and is not a fraudulent entity.

As one specific example, the disclosed techniques are particularly useful for entities participating in a multi-sided network (e.g., consumers, sellers, merchants, partners, etc. interact via the identity service to buy, sell, trade, etc. private information). The disclosed techniques may advantageously allow individual users to control and maintain the privacy of their information without utilizing a centralized agency such as a credit bureau. Further, the disclosed techniques allow the user to have control over which portions of their private information get shared with other entities (e.g., an employer, a university, a loan agency, etc.), while providing for readily available verification of credentials and private information shared between various entities using the disclosed techniques. For example, if an employer receives a transcript from an individual applying for a position with the employer, this employer can verify the credibility of this transcript by looking up the transcript (e.g., via its DID) on a public blockchain. This lookup will reveal to the employer, whether it has been revoked, etc. by a given university. Using disclosed techniques, individual users are able to provide a minimal set of private information without having to utilize third-party login services which often collect and sell their private data (e.g., for advertisement purposes). As such, individuals can have access to their private data at all times as well as control various aspects of the use of their private data.

Example Trust System

FIG. 1 is a block diagram illustrating an example trust system. In the illustrated embodiment, a trust system 100 includes a server system 110, a server system 122, a server system 170, decentralized network 160, issuer device 130, holder device 150, and verifier device 140. In various embodiments, devices 130, 140 and 150 are mobile devices (e.g., a tablet or a mobile phone), a desktop computer, a laptop, etc. For example, in situations in which holder device 150 is a mobile device, this application may download an application that includes the holder service (e.g., a mediator service application called identity.me provided by PayPal™) to participate in a decentralized identity process. In other situations, the holder service may be accessed via a browser on a desktop computer.

Server system 122, in the illustrated embodiment, includes issuer service 104, which may be hosted in the cloud or in a data center of the issuer entity. Issuer service 104 may be offered to an issuer entity. An issuer entity may be a trusted entity that issues documents and credentials with claims of user data to various holder entities. Issuer entities can use a service provided by PayPal, for example, to issue credentials to holders or may issue such credentials on their own via the use of the decentralized blockchain. The infrastructure provided by issuer service 104 allows issuers to access a public blockchain (e.g., blockchain 162) to both issue credentials to and revoke credentials of various holders.

Server system 110, in the illustrated embodiment, includes a mediator service 190 which includes an identity service 120, which in turn includes a holder service 106. The mediator service 190 is a service offered by e.g., PayPal in a multi-sided network that may orchestrate the functions for an issuer entity, a holder entity, and a verifier entity in the trust triangle as described in further detail below with reference to FIG. 6. Holder service 106 is a service provided by e.g., PayPal to a holder entity including providing a digital wallet. As discussed in further detail below with reference to FIG. 6, the holder entity may be a consumer, a merchant, or a partner. The identity service 120 may be hosted by server system 110 in the cloud. As one specific example, server system 110 may be a server of PayPal and may offer the identity service 120 to various client systems. These client systems may be for a consumer, a merchant, or a partner. For example, the merchants, in turn, may offer the same services to their consumers, while the partners may offer the same services to their merchants, who in turn may offer the services to their consumers, resulting a multi-sided network being built. For example, the holder service 106 included in identity service 120 may be offered to a holder entity. The holder service 106 included in identity service 120 allows holder entities to receive credentials from various issuers and then provide these credentials for various verifiers to meet the identification requirements of the verifiers. For example, PayPal may provide holder service 106 to a user in addition to providing a digital wallet to the user. These users may include consumers, merchants, partners, etc. Holder service 106 receives, stores, and controls verifiable credentials owned by a holder entity. The holder service 106 allows holders to approve attestation requests (e.g., requests could be for personally identifiable information (PII)) from verifier entities.

Server system 170, in the illustrated embodiment, includes a verifier service 108. Verifier service 108 allows verifier entities that want to verify claims (e.g., of identity) received from a holder in order to perform a transaction. For example, a holder may wish to apply for a loan from a loan company or bank and may supply a proof of income attestation to the verifier and the verifier may access blockchain 162 to determine whether the proof of income was issued by a credible entity and whether documentation used to provide this proof of income have been revoked by the issuer. In disclosed techniques, a verifiable credential is a piece of information (in the form of an electronic document) issued by an issuer entity to a holder entity, where this credential includes metadata (which could be private user data) and claims. Metadata included in verifiable credentials are claims that may be used to respond to a request for attestation using a zero-knowledge proof method of authentication. A zero-knowledge proof is a method of authentication that employs cryptography, allowing an entity to prove to another entity that certain requirements for a transaction are met without that other entity seeing (all of) the proof itself. For example, in many situations, just enough information to complete the transaction is shared. Claims may be related to a holder entity's identity (e.g., this user is a US citizen, lives in the South America, is 25 years old, etc.). Verifiable credentials may be used as attestations to respond to requests for proof of one or more claims. When claims from multiple verifiable credentials are consolidated in order to respond to requests for proof (from verifiers), these combined credentials may be referred to herein as a "compound verifiable credential."

In the illustrated embodiment, an issuer device 130 utilizes the issuer service 104, a holder device 150 utilizes a holder service 106, and a verifier device 140 utilizes a verifier service 108, respectively, to participate in a digital identification process. Issuer device 130, for example, utilizes issuer service 104 to form a secure connection 132 with holder device 150 via a peer-to-peer pairwise process using DIDs. For example, issuer device 130 may submit a request to the issuer service 104 to form a secure connection with holder service 106. This process is discussed in further detail below with reference to FIGS. 2 and 4. After a secure connection is formed between issuer service 104 and holder service 106, the issuer service transmits, via the secure connection, one or more verifiable credentials to the holder service. The holder device 150 securely (via cryptography) stores this credential in a wallet provided by holder service 106. In addition to transmitting one or more verifiable credentials to holder device 150, the issuer device stores the transaction (indicating that one or more credentials were issued to the holder) on the blockchain 162.

Holder device 150 sends connection request 152 to holder service 106 to form a secure connection between holder service 106 and verifier service 108. Holder service 106 forms a peer-to-peer DID pairwise connection (secure connection 142) with verifier service 108 and securely transmits one or more verifiable credentials, stored in a wallet of the holder service 106, to the verifier device 140 via connection 142. The verifier checks whether one or more DIDs included in the received proof (i.e., the one or more verifiable credentials) correspond to a credible issuer (via governance bodies) and also checks the one or more DIDs against the blockchain to ensure that the DIDs did in fact issue the provided credentials. The verifier may also determine whether these credentials have been revoked by the issuer. For example, in response to the holder entity transmitting the one or more verifiable credentials to the verifier (e.g., the holder approves of private information being shared with the verifier entity), the verifier service 108, determines using a DID of the issuer entity, whether the issuer entity issued the credentials, whether the issuer entity is trusted, and whether the issuer entity has revoked the credentials. In various situations, each secure connection between a holder service and a verifier service formed using a DID is a unique connection.

In some embodiments, holder service 106 allows a holder entity to provide a minimal set of PII to a verifier to satisfy the requirements of the verifying entity while providing the least amount of information possible (e.g., without over-sharing private user data). For example, a holder may store identity information (verifiable credentials, such as PII and any of various digital identification documents of the user that have been issued by various entities) in a secure wallet provided by holder service 106. In this example, the holder (user) will pick and choose identity attributes from one or more verifiable credentials to be shared with a verifier. In this example, a user may choose to share their date of birth which is verified from their driver's license, but does not share the entirety of their driver's license with the verifier. A holder may share one or more portions of a document. In other situations, a holder may choose to share an entire document with a verifier entity.

The disclosed digital identity platform executed by system 100 protects the privacy of user's information in the following ways: private user data (such as PII) is not written to the blockchain, zero-knowledge proof methods are used to verify information, verifier entities do not need to contact issuer entities to verify credentials received from holders (due to the use of DIDs on the blockchain), and respective peer-to-peer pair-wise DIDs (used to form secure connections between devices sharing data) is unique for a given action/exchange of information.

Decentralized identifiers (DID) are globally unique identifiers that can be universally discovered on a blockchain. These IDs are interoperable and each DID is associated with only one DID document (DDO). A DDO includes descriptions of a corresponding DID, a public key for verification, a set of authentication protocols, service endpoints, a timestamp, and a signature. A DID resolver is a portion of program code that assists in locating a DID on a public blockchain. For example, a DID resolver takes a DID as input and returns a DDO (and its metadata) associated with the DID by calling a method used by a DID when it is generated.

The decentralized network 160 shown in FIG. 1 includes a network architecture that distributes workloads among several machines, instead of relying on a single central server (such as the server system 110 executing the identity service 120). This decentralized network 160 executes a blockchain 162 (e.g., a chain of blocks including data acting as a secure database) via a plurality of computing devices that may be geographically distributed. A blockchain may be private or public. In the context of a public blockchain, users within the blockchain (i.e., blocks within the blockchain) are anonymous (and are identified by their DID); whereas, in the context of a private blockchain, users are usually governed by a steward who authorizes and provides privileges to the participants on the blockchain. In disclosed techniques, a private blockchain may also be referred to as a permissioned blockchain. Blockchains may also be a hybrid (i.e., a combination of permissioned and public). In such scenarios, verifier entities may participate in a verification process via a public blockchain by submitting an attestation request to be verified via the public blockchain, while issuers may participate via a permissioned blockchain. In disclosed techniques, a blockchain is a decentralized ledger used to store a public DID, DDO, schemas, formal descriptions of verifiable credentials, revocation registries, and proof of data sharing. A revocation registry is a list of DIDs that have been revoked by a corresponding issuer entity. These registries are stored on the public blockchain so that verifiers can be notified when credentials corresponding to the DIDs have been revoked (and, thus, this credential should no longer be used by the holder for attestations).

Example Identity Service

Figure 2:
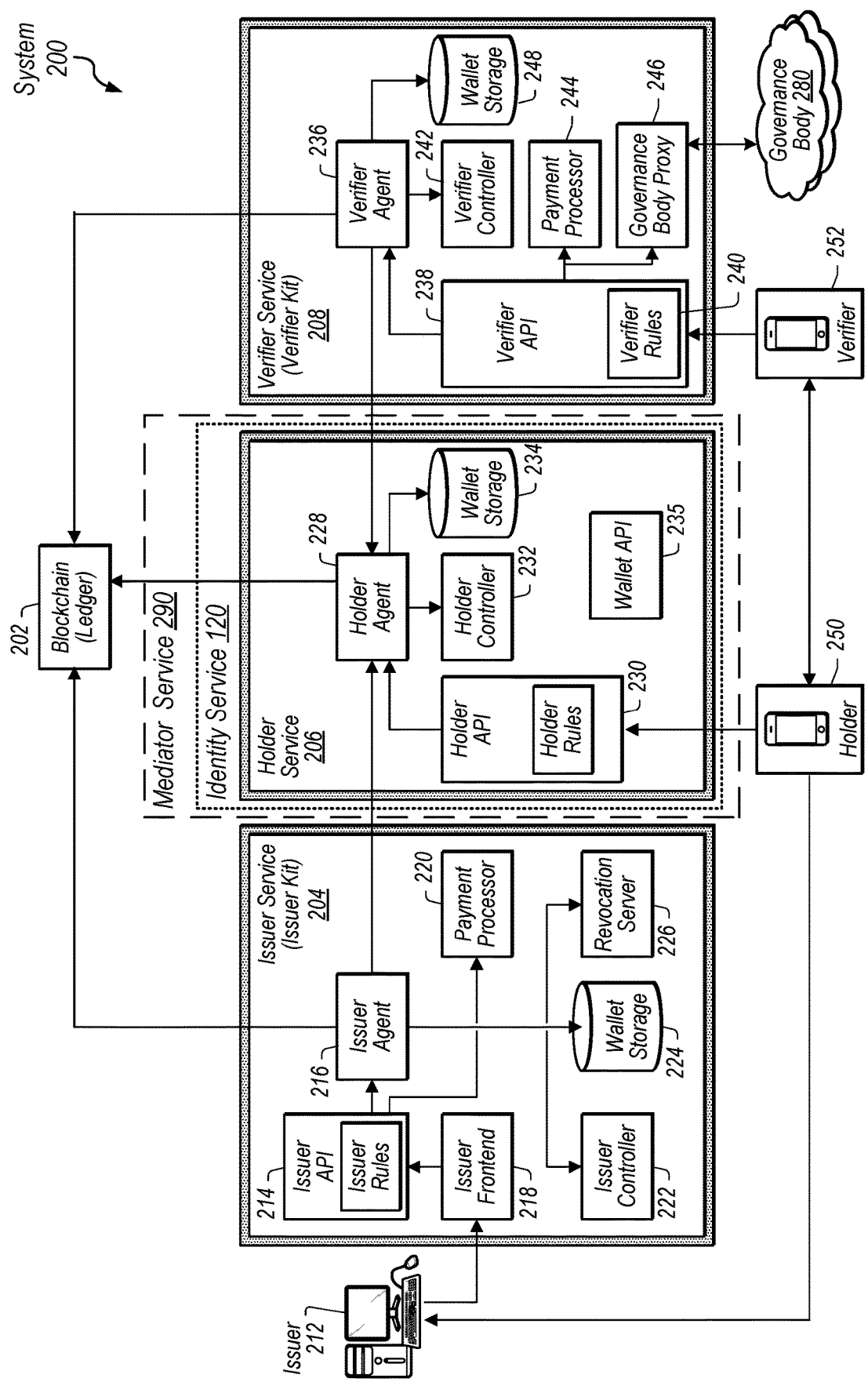
FIG. 2 is a block diagram illustrating an example identity service, according to some embodiments.

FIG. 2 is a block diagram illustrating an example identity service 120. In the illustrated embodiment, system 200 includes a blockchain 202, an issuer device 212, a holder device 250, a verifier device 252, a holder service 206, a verifier service 208, and an identity service 120, which in turn includes issuer service 204. In the illustrated embodiment, the identity service 120 is included in a mediator service 290 that facilitates interactions between various entities in a multi-sided network to complete transactions. In various embodiments, services included in system 200 are packages of software that are installed on individual machines provided by clients of the system 200 providing the various service to these clients. The issuer service may be a software package that is installed in the issuer's data center or hosted by a server on the cloud (e.g., PayPal) as a service. In such situations, there is a clear demarcation between the system that is audited to ensure that there is no conflict of interest. The verifier service may also be a software package that is installed in the verifier's data center or hosted by server as a service. The issuer device 212 may be a mobile device or laptop and may use the issuer service software to carry out various identification issuance functions. The respective devices shown in FIG. 2 execute various functions in an identification process while utilizing their respective software services (i.e., issuer service 204, holder service 206, and verifier service 208).

Issuer service 204 may be packaged as an "issuer kit" that includes software executable to provide a service to an issuer entity. In some embodiments, the issuer service is hosted separately from the identity service 120. For example, PayPal may host the issuer service on a cloud server. In other embodiments, the issuer service is packaged as an issuer kit and installed on a machine of the issuer. This service allows the issuer entity to securely issue verifiable credentials to various holder entities as well as securely store a set of information about the issued credentials (for verification) on a blockchain 202. The issuer entity does not store issued credentials on the blockchain 202.

The issuer service 204 provides an administrator of the issuer entity with an admin interface allowing the admin to configure, for example, schemas for verifiable credentials to be used by tenants of the issuer entity to provide credentials to holder entities. For example, an admin of Shopify™ (an issuer entity) may provide schema IDs to a given tenant (a particular store executed on the Shopify platform) to be used when issuing credentials to holder entities. This allows for each tenant of a given issuer entity to use a respective wallet, agent, and controller (e.g., each controller services a given wallet of a given tenant). In addition, the configurability of the issuer kit allows an issuer admin to choose which ledger (blockchain) to use. In various embodiments, the software included in the issuer kit may be executed using one or more of the following: React™, PostgreSQL™, Python Flask server, Docker™, Hyperledger Aries, etc. The issuer service 204 includes the following components: issuer frontend 218, issuer application programming interface (API) 214, issuer controller 222, wallet storage 224, revocation server 226, issuer agent 216, and payment processor 220.

The issuer frontend 218 is a graphical user interface (GUI) that an issuer entity interacts with via their device 212 to issue credentials to holder entities. The issuer API 214 is the backend portion of the program code included in the issuer kit for the issuer frontend 218. Issuer API 214 includes various issuer rules. These rules may be business rules indicating e.g., steps or conditions that a holder entity must meet prior to a credential being issued to the holder, an amount to be charged to the holder entity prior to a credential being issued, an amount of time that certain issued credentials are valid for before they are to be revoked by the issuer entity, etc. In situations in which the issuer rules include a charge for a credential, the holder entity may pay the issuer entity via the use of their wallet (wallet API 235).

The issuer controller 222 is a webhook listener (which may be implemented using Hyperledger Aries), that performs customized logic (e.g., custom business logic) for the issuer entity. When an issuer device and a holder device connect for transmission of a verifiable credential from the issuer to the holder, the issuer controller 222 manages a proper sequence of messages executed by an agent between the issuer and the holder. The issuer entity, holder entity, and verifier entity each have their own wallets, agents, and controllers. For example, the sequence of communication may include one or more of the following: the issuer proposes an offer (of a credential) to the holder, the issuer requests confirmation from the holder, the issuer issues the credential, and then the issuer confirms with the holder that the credential was received. Wallet storage 224 stores wallets (e.g., credit card information, bank account information, etc.) and states for various credentials issued by the issuer entity. The revocation server 226 is used by issuer agent 216 to perform revocations of various credentials when appropriate. After performing revocations via revocation server 226, the issuer agent writes information about issued credentials (i.e., information that a transaction was executed) to blockchain 202. The issuer agent 216 is the primary agent for interacting with blockchain 202 and other agents (e.g., holder agent 228 and verifier agent 236). Transactions executed in the disclosed ecosystem involve cryptography. For example, the issuer agent 216 transmits a credential to the holder agent 228 of a holder entity and then writes a transaction to the blockchain indicating that the issuer entity issued the credential to the holder. The transaction written to the blockchain includes a DID, a schema ID, etc. for the issued credential (the issuer agent 216 does not write the issued credential (PII) to the blockchain 202). The issuer agent 216 has control over a private key involved in writing the transaction to the blockchain and has a controller 222 that defines the business rules regarding the actions the issuer agent can take and the sequence for their execution.

Agents discussed herein (issuer agent 216, holder agent 228, and verifier agent 236) include portions of program code associated with wallets of different entities that make secure connections with other agents and wallets in order to communicate identity or other information (e.g., user credentials) to complete a transaction. In various embodiments, the agents discussed herein may be edge agents that run on devices of the different entities or may be cloud agents that run on a server (in the cloud) of the identity service 120.

Holder service 206, in the illustrated embodiment, includes holder agent 228, holder controller 232, wallet storage 234, holder API 230, and wallet API 235. The holder API 230 is a front-facing backend that a device 250 (which may be a mobile device) of the holder entity calls. Holder API 230, in the illustrated embodiment, includes holder rules that are deployed to meet criteria for managing the identities and credentials of the holder when receiving credentials from issuer entities and providing attestations to verifier entities. For example, a holder may use private data from multiple different credentials (issued by the same or different issuer entities) to respond to an attestation request from a verifier.

The holder controller 232 is a webhook listener that is triggered by actions taken at a user interface of the holder device 250. The wallet storage 234 functions similarly to the wallet storage 224 of the issuer service and stores wallets and states of the holder entity. For example, this storage 234 allows holders to export their wallets from other systems (e.g., Apple Wallet™, Google Pay™, etc.). Wallet storage 234 may store verifiable credentials received from issuers, private keys, link secrets, various cryptographically sensitive data, current payment balances (in either tokens or fiat currencies), and financial instruments usable by a holder to make payments. The wallets 224 and 238, respectively, may store similar data to wallet storage 234. The holder agent 228 is executed by the holder service for interaction with blockchain 202 and other agents, such as issuer agent 216 and verifier agent 236. The wallet API 235 provides an interface to other systems that the holder interacts with. As one specific example, holder service 206 may be provided by PayPal and this service may interact with other PayPal systems. In this specific example, the wallet API provides an interface for these other systems. Further in this example, the holder service 206 will be plugged into PayPal's overall ecosystem such that the holder service may be treated as a service of PayPal.

Verifier service 208 may be referred to as a "verifier kit" that includes software executable to provide a service to a verifier entity, the service allowing the verifier entity to verify credentials received from holder entities. The service provided by the verifier kit also allows the verifier entity to send verification requests. In other embodiments, the verifier service may be packaged and installed on a third party's machine. For example, PayPal may securely distribute the verifier kit to the verifier entity for installation on one or more of their devices.

Verifier service 208, in the illustrated embodiment, includes verifier agent 236, verifier controller 242, payment processor 244, governance body proxy 246, verifier API 238, and wallet storage 248. Verifier API 238 is a front-facing backend component that verifier device 252 calls. The verifier controller 242 is a webhook listener that is triggered by activity at an interface of the verifier device 252. Wallet storage 248 stores wallets and states of the verifier entity. Verifier agent 236 interacts with blockchain 202 and other agents, such as issuer agent 216 and holder agent 228. Payment processor 244 allows verifiers to pay for each received and verified credential. The verifier rules 240, however, may be executed such that the verifier does not pay when credentials are received/verified. The governance body proxy 246 proxies requests to one or more governance bodies 280 that may perform a verification process on issuer DIDs to verify the integrity of the issuer entity. The governance layer of the disclosed decentralized identity architecture is discussed in further detail below with reference to FIG. 5.

As discussed above, in some embodiments, a compound verifiable credential is sent to the verifier device 252 from the holder device 250. For example, holder service 206 may preprocess private user data stored in wallet storage before providing this data to a verifier. As one specific example, holder service 206 may look up a holder's age based on today's date and the date of birth listed on the holder's driver's license and store a compound verifiable credential in the wallet 234 of the holder indicating the holder is above a certain age to complete the transaction. The holder service then writes to the blockchain that this transaction, confirming that the holder is above a certain age, took place. Holder service 206 then causes the compound verifiable credential specifying the holder's current age to be transmitted to verifier device 252. The credential may be transmitted with claims (attributes) that make up a proof. This compound verifiable credential can be verified by the verifier by accessing the blockchain to look up the DID of the issuer to verify that the driver's license comes from a trusted entity and has not been revoked and that the age indicated in the compound verifiable credential was calculated by a trusted entity (e.g., the identity service 120 which may be PayPal). In this example, the determination by the verifier that the compound verifiable credential is valid and trusted may be performed by obtaining the DID of the issuer from the blockchain and determining whether this issuer is a trusted source.

As one specific example, a holder entity may be a student that requests a college diploma from a university (an issuer) after they graduate from the university. This student may enter an admin building of the university to request their diploma and in order for the university to securely provide the college diploma to the student, a university employee sends a request via their device to form a secure connection with a device of the student. The issuer service provides a scannable code to the issuer device and this device displays the scannable code and the student scans the displayed code with their device (e.g., scans a QR code displayed on the desktop of the university using their mobile phone). Once the secure connection is formed, the university transmits a cryptographic version of the diploma (e.g., the secure connection provides encryption and decryption) to the student's device where it is securely stored in their wallet (i.e., wallet storage 234). Prior to securely transmitting the diploma to the student's device, the university generates the diploma, specifies in a schema for the diploma that it includes a set of fields/attributes and what type of information each of these fields/attributes include. The university then stores the schema, along with their endpoint, their location, and the DID of the university (indicating that a transaction has taken place between the student and the university) on the public blockchain 202. The university first registers their DID, the schema of the diploma, a definition of the diploma, and their endpoints on the blockchain before the university is able to issue a diploma as a verifiable credential.

Further in this example, the student may wish to share their diploma with a potential employer (a verifier entity) in order to apply for a job. The student submits a request via the holder service 206 to form a secure connection with a device of their employer (e.g., verifier device 252). The holder service 206 provides a scannable code to the student to be displayed via their device for scanning by a device 252 (e.g., a mobile phone) of the employer. Once a secure connection is formed between the student's device and the employer's device (based on the scanning), the holder service 206 retrieves the diploma from wallet storage 234 and transmits a cryptographic version of the diploma to verifier device 252. The employer may access the blockchain 202 to verify the authenticity of the diploma while also verifying that this diploma has not been revoked by the university that originally issued it. For example, the employer is able to verify, via the unique DID corresponding to the diploma, that this diploma is not included on a revocation registry stored on the blockchain 202.

Further in the scenario discussed above, the employer does not necessarily have to download the verifier service 208 on their device as long as the verifier entity is using a public blockchain and they have obtained their own DID (upon registration). The issuer entity may interact with the disclosed identity service in a similar way. For example, the issuer does not necessarily have to download the issuer service on their device. In the employer example, the employer can verify that the potential employee went to Stanford University based on the DID of the university being included with the diploma received from the potential employee. For example, the issuer entity may register with a public blockchain in order to securely upload verifiable information about the diploma they provided to the potential employee.

As used herein, the term "Application Programming Interface (API)" is intended to be construed according to its well-understood meaning, which includes an interface between two applications. When you write a program, you often define various functions for blocks of code that you want to run frequently and cause them to be run by making a function call. While a function call is traditionally used to provoke the execution of a function within the same application, an API call is really a function call to provoke the execution of a block of code in another program. For example, an application might want to open a file on a computer having a file system managed by an operating system. To do this, the application may make an API call into the operating system to receive file data. The operating system may support this call by exposing an API to the application.

Note that while various examples herein discuss interactions between issuer, holder and verifier entities that are registered with a blockchain, these interactions are discussed for purposes of explanation and are not intended to limit the scope of the present disclosure. In other embodiments, the interactions between the holder and the verifier may be conducted without the verifier entity being registered with a blockchain. For example, any two entities can connect with one another using wallets and agents by forming a peer-to-peer secure connection and transacting cryptographically and writing these transactions to the blockchain without other entities being able to see such transactions. In such situations, however, a verifier entity may not be able to confirm that a credential received from a holder entity has not been revoked by the issuer corresponding to this credential (e.g., the verifier will have to trust the credential inherently). In order to avoid having to inherently trust the integrity of a credential, in disclosed techniques, a verifier checks the integrity of the credential independently by looking up details of the issued credential on the blockchain without having to contact the issuer directly.

The disclosed identity service 120 executes the holder service 206 for different types of entities for any of various situations. For example, a user may use identity service 120 to accept claims of verifiable credentials stored in the digital wallet of another entity attempting to conduct an electronic transaction with the user. In the context of an online electronic transaction, a user may utilize identity service 120 to execute a payment for a verifiable credential to an issuer of the issued verifiable credential via one or more payment rails provided by service 120. As another example, a user may use identity service 120 to create verifiable credentials (which may be as simple as a picture of the user or as complex as a set of data about the user gathered from several different identifying documents of the user) in order to make attestations (e.g., the user proving they are who they say they are) using claims (e.g., the user says that they are 22 years old and went to a university in the state of California) upon request from a verifier entity.

The disclosed identity service 120 may also be utilized for regulatory and compliance situations to meet the regulatory requirements of an auditor such as the requirements of the General Data Protection Regulation (GDPR), the California Consumer Protection Act (CCPA), etc. In this example, regulatory reporting might be delivered by the identity service via a verifiable presentation, thereby reducing the cost and improving the efficiency of a review process. As another example, the disclosed service may be used for know your customer (KYC) processes (e.g., allow a user to quickly and securely identify themselves when registering for a new account). The disclosed service may be used by any of various types of entities, including consumers, merchants, partners (e.g., online platforms used by different types of customers such as both merchants and consumers), regulatory entities, credit bureaus, loan agencies, etc.

As discussed above with reference to FIG. 2, an issuer entity can either download an application on their computer or execute software for the identity service (e.g., some applications are built using open-source software) to begin providing verifiable credentials via secure transmission to holder wallets that are verifiable via blockchain. In some situations, issuers may accept payments for issued credentials from holders via the identity service. Issuers may be added to a list of trusted issuers of the identity service. After downloading the verifier kit and being added to a list of trusted verifiers of the identity service 120, verifiers may begin confirming the validity of holders' attestations by querying a revocation registry on the blockchain. For example, if there is a record for the attestation claim in the revocation registry (e.g., the data used to generate this claim has been revoked), then the attestation is invalid. In some embodiments, the verifier service is offered in a hosted manner, in which the verifier is the owner of the host (e.g., a device of the verifier provides access, via a user interface to the network on which the identity service is being hosted).

In some situations, a verifier entity may accept payments via various payments rails of the verifier service. For example, a holder entity may wish to apply at a university and, as part of the application process, may need to identify themselves and provide an application fee to the university (i.e., the verifier entity). In this example, the verifier entity may provide a diploma to the holder entity (upon graduation) via the identity service 120, thus the verifier entity transitions from being the verifier to the issuer in this scenario. As one specific example, the disclosed identity service may be used for travel by making reservations, showing credentials at check-in (e.g., at hotels, airlines, car rentals, etc.) paying for services, etc. The disclosed techniques may be used for any of various situations, including healthcare applications (e.g., verifying blood type), entertainment events (e.g., an individual may need to prove their identity/that they bought a ticket before entering a movie theater), schools, etc.

Various APIs, agents, controllers, processors, etc. executed by the different services included in the disclosed identity service may also be referred to as "modules" operable to perform designated functions are shown in the figures and described in detail above (e.g., issuer API 214, issuer agent 216, issuer controller 222, payment processor 220, issuer frontend 218, holder agent 228, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Holder Wallet

Figure 3:
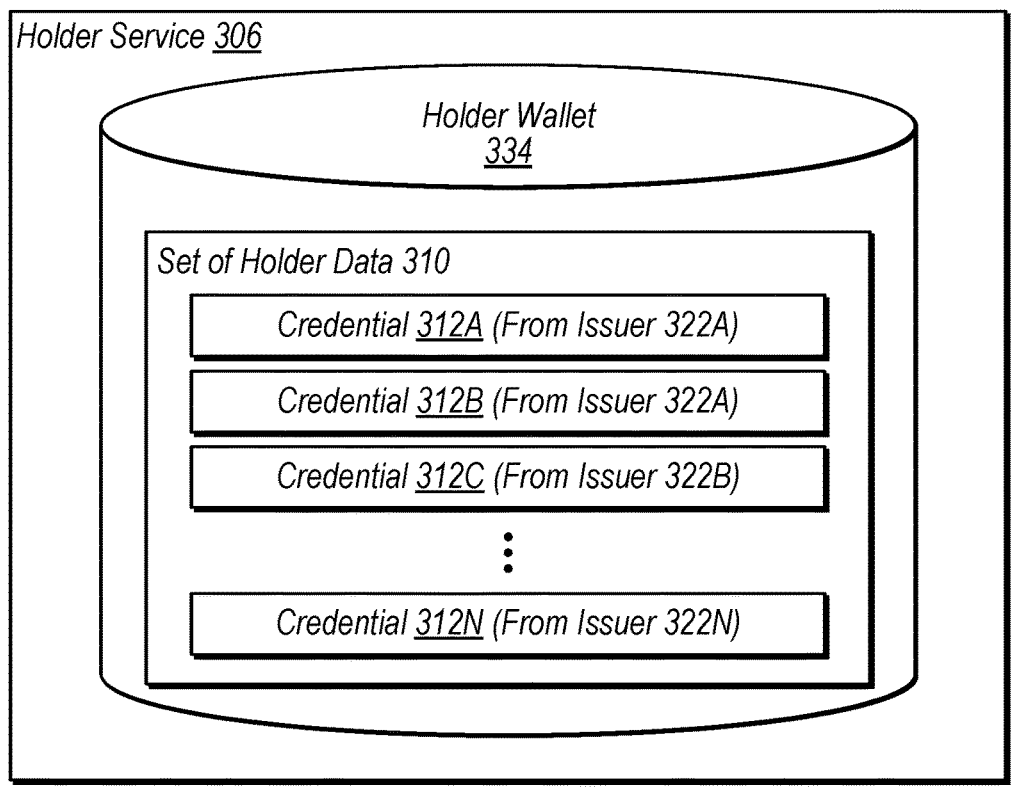
FIG. 3 is a block diagram illustrating an example holder wallet, according to some embodiments.

FIG. 3 is a block diagram illustrating an example holder wallet 334. In the illustrated embodiment, identity service 120 includes holder service 306, which in turn includes holder wallet 334. The holder wallet 334 securely stores a set of holder data 310 including a plurality of credentials 312A-312N issued by different issuers 322A-322N. For example, a first issuer 322A issued credentials 312A and 312B, a second issuer 322B issued credential 312C, while a third issuer 322N issued credential 312N.

As one specific example, issuer 322A writes a unique DID, the definition of the credential 312A, a schema of credential 312A, and a public key to the blockchain. In this example, issuer 322A also makes an entry in the revocation registry of the blockchain for the credential 312A in case the credential needs to be revoked in the future. Only the holder knows when the credential is revoked, but with zero-knowledge proof (as discussed above with reference to FIG. 2), the holder can prove to a verifier that the credential 312A has not been revoked based on the unique DID of the credential 312 in the ledger.

Credentials 312 such as those shown in FIG. 3 stored within a wallet of a holder entity (and managed by a holder service 306) may include one or more of the following types of information: a driver's license, a passport, a diploma, identification documents (e.g., student ID, government-issued ID, library card, frequent shopper card, an employee ID, etc.), a letter of recommendation, titles (e.g., of vehicles, homes, etc.), individual certifications, etc.

In various embodiments, the disclosed techniques may improve the security of private user data through secure storage of this data in a user's digital wallet (which is portable, private, and secure) while allowing other entities to verify the user private data without actually seeing the data via cryptography on a blockchain. In addition, the disclosed techniques remove or reduce the need for third-party login services, while still providing users with control over their private information across any of various platforms requiring identification/verification of the user. Further, the disclosed techniques provide for flexible and consistent availability of verification of user data. For example, traditionally verification of user data shared with a verifier entity could only take place if the issuer of the user data was available. The disclosed techniques, however, do not rely on the availability of the issuer to provide verification to the verifier entity of user data. For example, in disclosed techniques, the verifier entity does not contact the issuer entity.

Example Secure Connections

Figure 4:
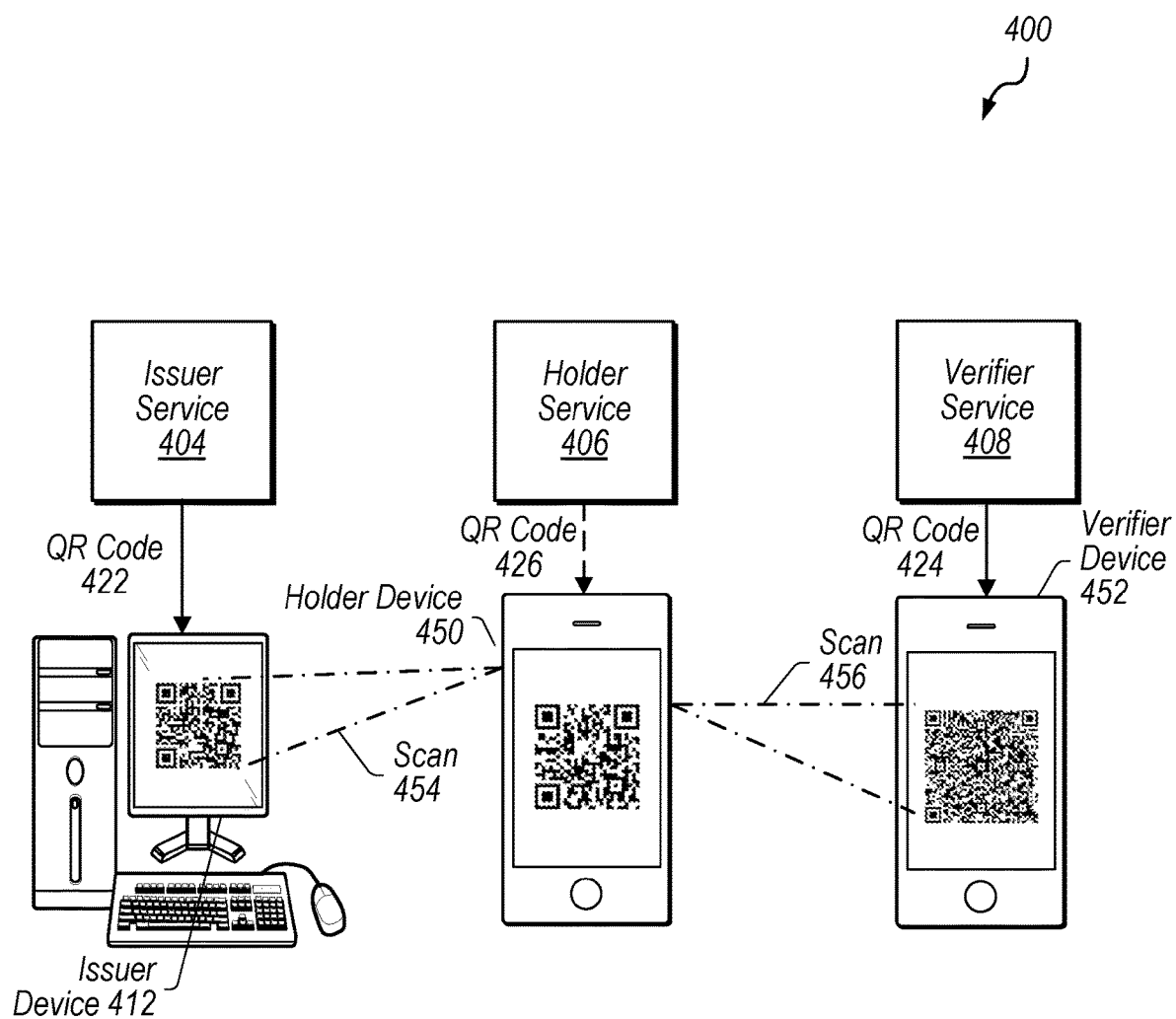
FIG. 4 is a diagram illustrating example establishment of secure connections, according to some embodiments.

FIG. 4 is a diagram illustrating the example establishment of secure connections. In the illustrated embodiment, example 400 includes an issuer service 404, holder service 406 and three devices: issuer device 412, holder device 450, and verifier device 452. Issuer device 412 receives a QR code 422 from issuer service 404 based on a user of the issuer device requesting, via a user interface of device 412, to make a secure connection with another device. In response to receiving code 422, issuer device 412 displays the code, and holder device 450 performs a scan 454 of the displayed QR code 422. In response to the scan, the holder device 450 may display a confirmation message to the holder via a user interface of device 450. After scanning the QR code 422 and in response to the holder confirming that they would like to make the connection, holder device 450 forms a secure connection with device 412. The secure connection is formed between a holder agent 228 of the holder device and a verifier agent 236 of the verifier device. For example, this connection may be established using a unique pair-wise DID. In situations in which the pairwise DID is made available to a non-authorized entity (e.g., a malicious third party) if one of the entities involved becomes compromised, then the other entity may cancel the DID and issue a new (uncompromised) DID.

Similarly, verifier device 452 receives a QR code 424 from verifier service 408 in response to requesting to form a secure connection with another device. Verifier device 452 displays the code 424 via a user interface of this device and holder device 450 performs a scan 456. Once holder device 450 has scanned QR code 424, a unique pair-wise DID connection is formed between the two devices 450 and 452. After forming a secure connection and in response to a verification request from the verifier, holder device 450 may securely send private data to the verifier device 452 over the secure connection. For example, this connection may be established using a unique pair-wise DID. In some embodiments, the agents included in the holder service 406 and the verifier service (not shown) utilize the secure connection between these two devices to communicate using an agent-to-agent protocol (referred to as a DID communication protocol). The codes supplied by issuer service 404 and holder service 406 may be any of various other types of scannable codes besides QR codes.

In some embodiments, holder service 406 provides a QR code 426 to holder device 450 and holder device 450 displays code 426 via a user interface of the device. QR code 426 may be scanned by verifier device 452 to form a secure connection between verifier service 408 and holder service 406. Similarly, issuer device 412 may scan QR code 426 to for a secure connection between issuer service 404 and holder service 406. In various embodiments, information communicated via the secure connections established between the devices in FIG. 4 is secured using cryptography which includes the generation of public and private keys, hash generation and verification, and encryption and decryption of data. Any of the various cryptographic functions and methods may be called during the communication of data over secure connections.

Example Trust System Architecture

Figure 5:
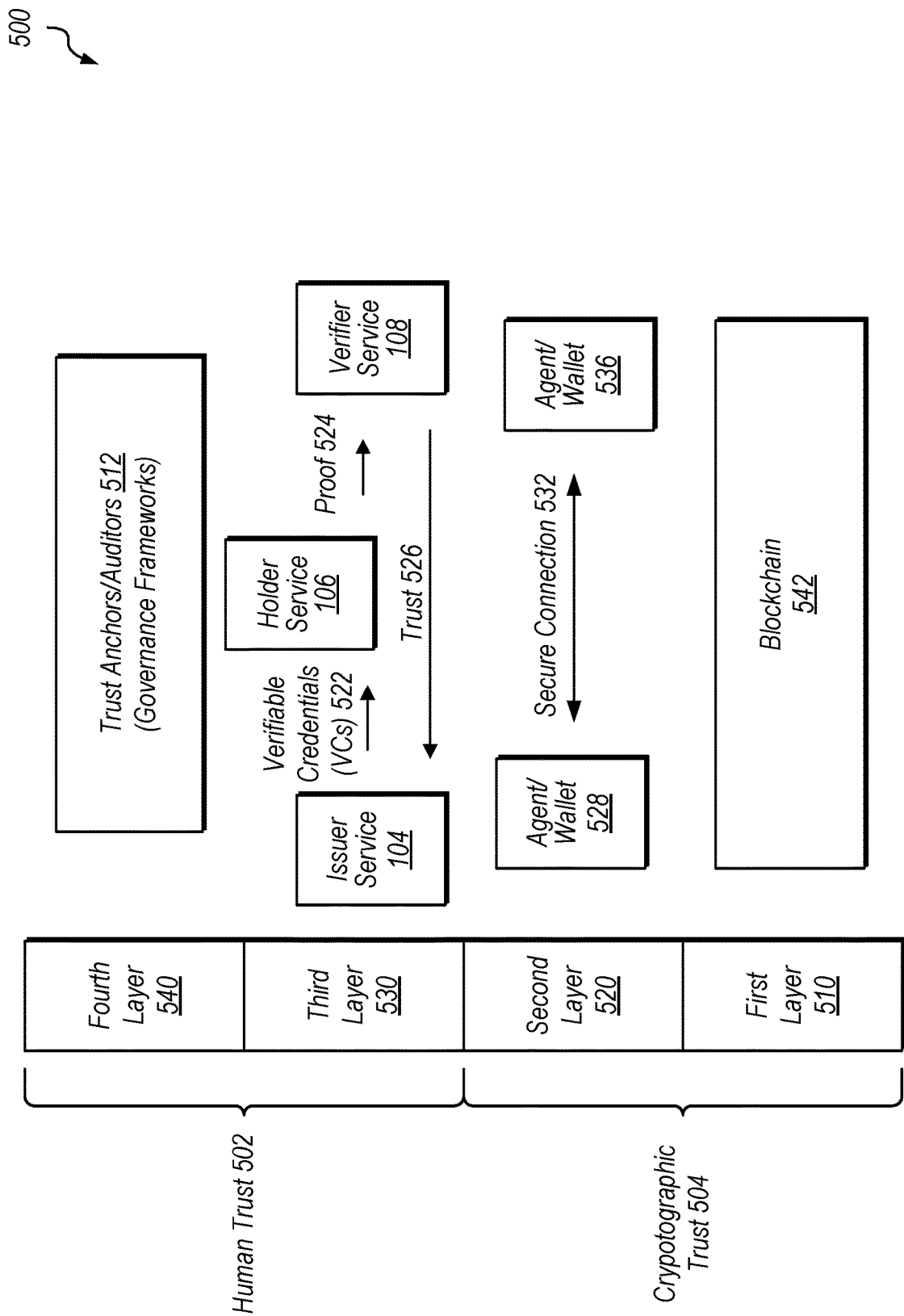
FIG. 5 is a block diagram illustrating an example trust system architecture, according to some embodiments.

FIG. 5 is a block diagram illustrating an example trust system architecture. In the illustrated embodiment, example 500 shows the architecture of the disclosed trust system, including a first layer 510 including a blockchain 542, a second layer 520 including wallets and agents of different entities utilizing the services of the third layer 530, a third layer 530 of the trust triangle (such as identity service 120 shown in FIG. 1), and a fourth layer 540 of governance frameworks.

The first layer 510 and the second layer 520, in the illustrated embodiment, make up the layers of the disclosed system that involve cryptographic trust 504. The first layer 510 of the architecture includes the blockchain 542. This layer 510 registers DIDs of different entities utilizing identity service 120 (including both DIDs and DDOs which includes a description of a DID, a public key for verification, a set of authentication protocols, service endpoints, a timestamp, and a signature). This first layer 510 also includes schemas and descriptions of verifiable credentials belonging to holder entities and provided by issuer entities. First layer 510 also includes a revocation registry and proof of consent from various holder entities providing consent for data sharing.

The second layer 520 includes the establishment of a peer-to-peer secure connection between two devices in order for the agent/wallet 528 and the agent/wallet 536 of these respective devices to communicate private user data (e.g., holder attests something by passing information to the verifier via the secure connection 532). The second layer 520 allows for secured pairwise connections between the devices of different entities to facilitate secure communication of private information via encryption/decryption. This second layer 520 includes the management of information stored in entities' wallets (including backup of such information). For example, the identity service may backup the wallet of any of the issuer, holder, and verifier entities via either hot or cold storage.

The third layer 530 and the fourth layer 540, in the illustrated embodiment, make up the layers of the disclosed system that involve human trust 502. For example, the third layer 530 includes an identity service (e.g., service 120 shown in FIG. 1), which in turn includes issuer service 104, holder service 106, and verifier service 108 providing different entities the ability to perform attestations and verifications. For example, the third layer 530 allows an issuer to issue verifiable credentials 522 to a holder entity after they have established trust 526 (e.g., via the trust anchors/auditors 512 of the fourth layer 540). As discussed above, verifiable credentials are statements made by an issuer in a tamper-evident manner while also respecting the privacy of the data included in the verifiable credential. Holders can store, via the identity service, verifiable credentials from multiple different issuers in their wallet. The identity service allows the combination of verifiable credentials from different entities for a single attestation (proof 524) to a given verifier. The given verifier can verify the combined attestation received from the holder by verifying a revocation registry stored on the blockchain indicating whether the one or more verifiable credentials used to generate the combined attestation are valid.

The fourth layer 540 includes trust anchors or auditors 512 that make up governing frameworks (e.g., the World Wide Web Consortium (W3C), trust over IP foundation, etc.) that ensure trust among different parties via a set of defined rules for various parties operating within a given ecosystem (e.g., consumers and merchants participating in electronic transactions via different transaction processing systems). For example, trust anchors/auditors 512 ensure the veracity of issuer entities. Said another way, trust anchors/auditors 512 ensure that players in the ecosystem follow guidelines, providing transparency that permits stakeholders to access information in order to understand incentives, rules, and policies that govern participants (issuers, holders, and verifiers) of the ecosystem.

Example Multi-Sided Network

Figure 6:
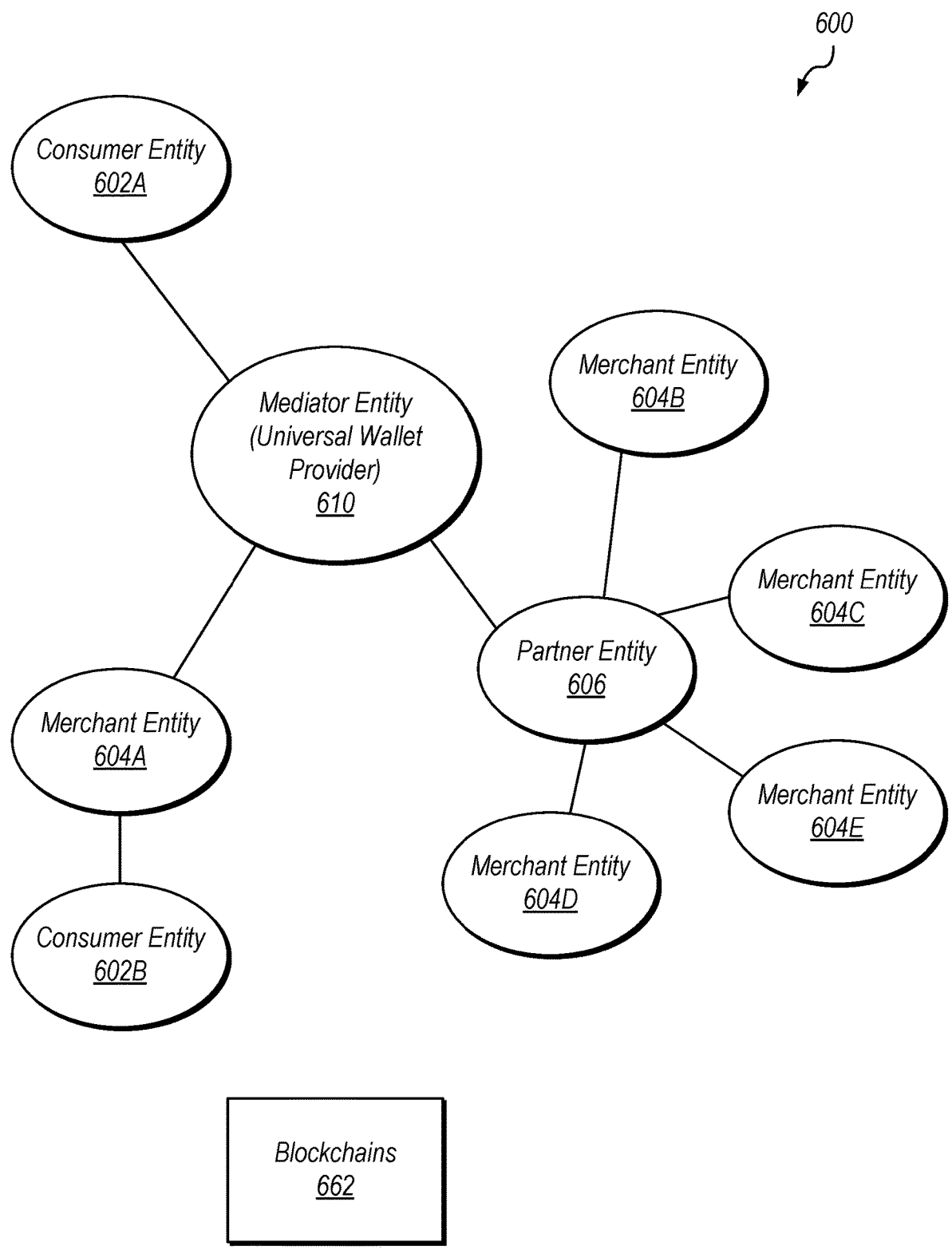
FIG. 6 is a block diagram illustrating an example multi-sided network facilitated by a mediator service, according to some embodiments.

FIG. 6 is a block diagram illustrating an example two-sided network facilitated by an identity service. As discussed above, the identity service provided to holders may be a mediator service. In the illustrated embodiment, example 600 shows the ecosystem of a two-sided network capable of utilizing blockchains 662 to securely issue and verify credentials. A holder entity may be a consumer, a merchant, or a partner. The disclosed mediator service may act as a wallet provider for any of the various types of holder entities. For example, a seller may utilize the disclosed mediator service for various consumers. As another example, a partner may utilize the disclosed mediator service for various merchants. As one specific example, PayPal's role in the disclosed ecosystem is that of a mediator, providing a digital wallet and payment rails when the disclosed system is monetized (e.g., for holders to pay issuers for issued credentials). In disclosed techniques, digital wallets may be portable from one wallet provider to another. For example, an Apple Wallet™ may be backed up to the wallet provided by the mediator entity 610 to be utilized by a holder in various decentralized identification processes facilitated via a blockchain. In the illustrated example, the mediator entity 610 is a universal wallet provider for various entities (consumers, merchants, and partners). The wallet function provided by the disclosed mediator service may be used, for example, by a holder to pay for issued credentials (or indeed an issuer may pay for the mediator service in order to issue credentials to holders using the service) as well as to present proofs of verification.

Example 600 illustrates the disclosed multi-sided network in that a holder may interact with consumer entities (such as consumer entity 602A), merchant entities (e.g., merchant entity 604A), and partner entities (e.g., partner entity 606). Merchant entities such as merchant entity 604A may also interact with consumer entities, such as consumer entity 602B as shown in the illustrated embodiment. The partner entity 606 may in turn act as a holder entity to various merchant entities (e.g., merchant entities 604B-604E). For example, the disclosed digital identity services may be offered to merchants and partners as well as individual users. As one specific example, a partner entity may be an organization that holds its digital wallets either on a central server or on the cloud. In this example, the wallet of the partner entity may hold licenses, authorizations, deeds, etc. that may be used by the organization to conduct business with various merchants. The organization's wallet capabilities are similar to those of a holder's wallet (such as an individual user).

Example Method

Figure 7:
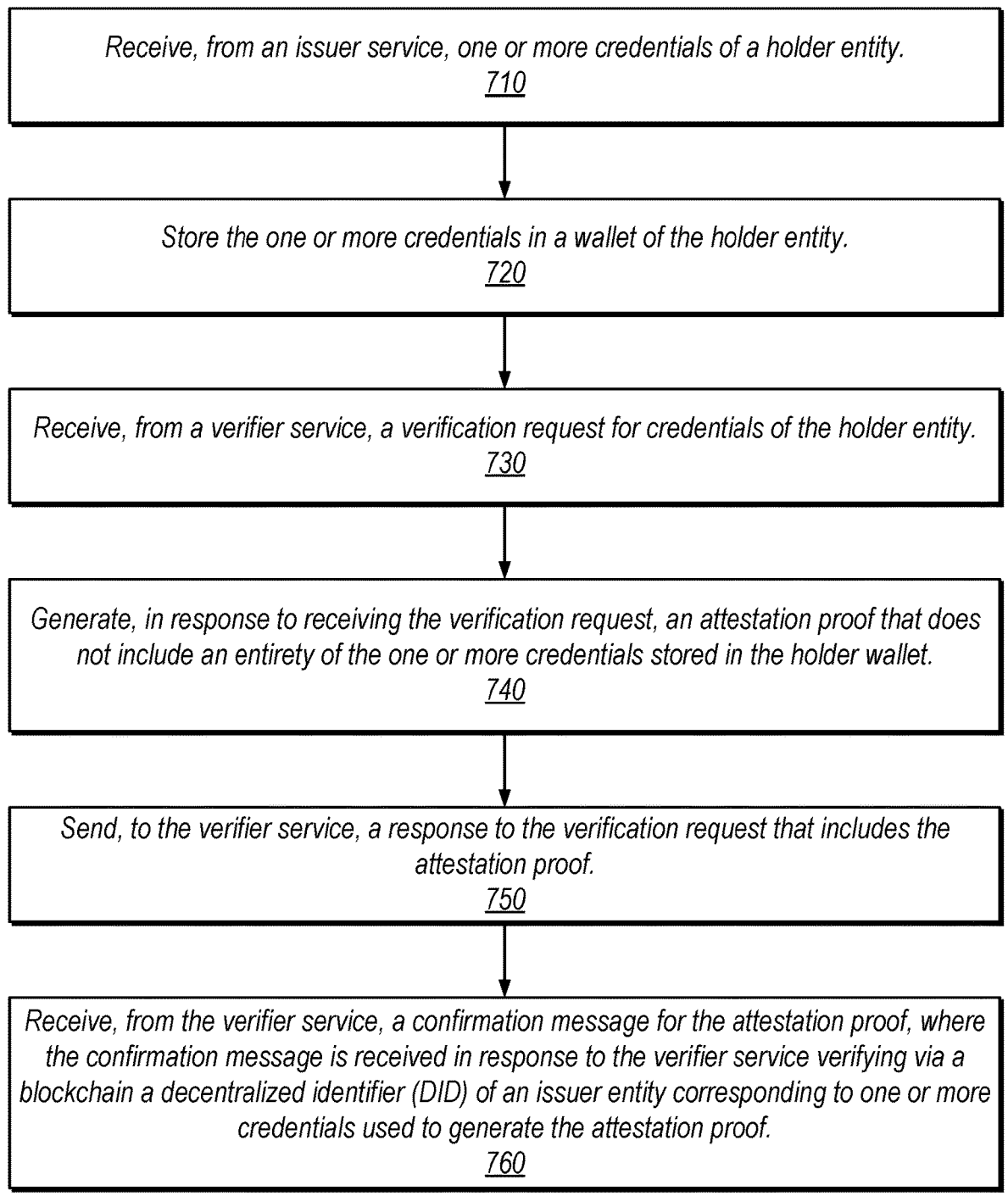
FIG. 7 is a flow diagram illustrating a method for providing less than an entirety of credentials stored in a holder's wallet in response to a verification request of a verifier entity, according to some embodiments.

FIG. 7 is a flow diagram illustrating a method for providing less than an entirety of credentials stored in a holder's wallet in response to a verification request of a verifier entity, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The elements of FIG. 7 may be performed by the identity service 120 of server system 110.

At 710, in the illustrated embodiment, a server system executes a holder service to receive, from an issuer service, one or more credentials of a holder entity. In some embodiments, the one or more credentials of the holder entity are received from at least one issuer entity. In some embodiments, the holder service receives the one or more credentials by causing, via a user interface of a holder device of the holder entity, display of a scannable code. In some embodiments, the holder service receives the one or more credentials by, in response to the scannable code being scanned by an issuer device of the issuer entity, establishing a secure connection between the holder service and the issuer service. In some embodiments, the holder service receives the one or more credentials via the established secure connection. In some embodiments, the one or more credentials transmitted via the secure connection are encrypted using a DID of the issuer entity, where the secure connection is a pairwise connection formed using a pairwise DID of the issuer entity and a pairwise DID of the holder entity.

At 720, the server system stores, by the holder service in a wallet of the holder entity, the one or more credentials. In some embodiments, prior to the holder entity receiving the one or more credentials, the issuer service, writes, to the blockchain for respective credentials, a DID of the issuer entity, a schema of respective ones of the one or more credentials, and a public key. Further, the issuer service adds, to a revocation registry of the blockchain for respective ones of the one or more credentials, entries specifying whether the respective credentials have been revoked.

At 730, the server system receives from a verifier service, a verification request for credentials of the holder entity. In some embodiments, the verification request for credentials of the holder entity from the verifier service is received in response to the holder service causing a scan of a QR code displayed via a user interface of a verifier device associated with the verifier entity. In some embodiments, the verification request is received in response to the holder service transmitting in response to the scanning establishing a secure connection between the holder service and the verifier service the one or more credentials from the holder device to the verifier device.

In some embodiments, the DID of the issuer entity is usable by the verifier device to verify authenticity via the blockchain of one or more holder credentials received by the verifier service, where verification of credential authenticity is performed by comparing the DID of the issuer entity received with the attestation proof from the holder service with DIDs of the issuer stored on the blockchain. In some embodiments, the holder data transmitted via the secure connection is encrypted using a DID of the holder entity, where the secure connection is a pairwise connection formed using a pairwise DID of the holder entity and a pairwise DID of the verifier entity, and where sending the response to the verifier entity is performed using a zero-knowledge proof.

At 740, the server system generates, by the holder service in response to receiving the verification request, an attestation proof that does not include an entirety of the one or more credentials stored in the holder wallet. In some embodiments, the attestation proof is generated using one or more portions of user data included in one or more credentials stored in the holder wallet based on determining whether the one or more portions of user data include information meeting requirements of the verification request received from the verifier service for credentials of the holder entity. For example, the server system may determine whether one or more individual verifiable credentials include the necessary user data to satisfy an identification request from a verifier entity. As one specific example, the server system may determine if a first verifiable credential includes passport number for the user and determine if a second verifiable credential includes a bank account number for the user, when a verifier entity is an airline requesting identification and payment information for the user for an international flight the user is attempting to book.

In some embodiments, the confirmation message for the attestation proof is further received in response to the verifier service determining, via the blockchain, whether the issuer entity has revoked one or more of the one or more credentials used to generate the attestation proof. In some embodiments, verification of one or more portions of user data included in the set of holder data includes: determining, using the DID of the issuer entity, whether the set of holder data includes information meeting requirements of the verification request received from the verifier service for the holder entity, including determining, via the blockchain, whether the set of holder data has been revoked.

In some embodiments, the evaluating includes: determining private user data from one or more documents included in the set of holder data, calculating, based on the scraped private user data, an age of a user associated with the user data, and determining whether the calculated age satisfies a minimum age requirement specified in the verification request received from the verifier service for the holder entity. In some embodiments, the attestation proof is further generated in response to receiving an approval notification from the holder entity, where the approval notification includes a notification specifying holder data approved for sharing with a verification entity utilizing the verifier service. In some embodiments, the evaluating includes: determining a least amount of holder data that will satisfy a set of identification requirements specified in the verification request received from the verifier service and generating, based on the determining, the reduced subset of the set of holder data. In some embodiments, the attestation proof is generated using a reduced subset of holder data included in a set of holder data stored in the holder wallet.

At 750, the server system sends, by the holder service to the verifier service, a response to the verification request that includes the attestation proof. In some embodiments, a response that includes less than the entirety of the one or more credentials stored in the holder wallet is a reduced subset of the available user data stored in the holder wallet. For example, the reduced subset may be referred to as a "minimal set of user data" and includes a DID document (DDO) including a formal description of a verifiable credential, a public key for verification, a set of authentication protocols, one or more service endpoints, a timestamp, and a signature. In some embodiments, the holder service receives, from the verifier service, a confirmation message indicating that the less than the entirety of the one or more credentials included in the response are accepted by the verifier.

At 760, the server system receives, by the holder service from the verifier service, a confirmation message for the attestation proof, where the confirmation message is received in response to the verifier service verifying via a blockchain a decentralized identifier (DID) of an issuer entity corresponding to one or more credentials used to generate the attestation proof. In some embodiments, the attestation proof is generated using multiple credentials stored in the holder wallet.

In some embodiments, the issuer service (via the issuer device) sends a request to the holder service (via the holder device) to form a secure connection as well as a proposal to send a verifiable credential to the holder as part of a first transaction. In some embodiments, the holder accepts the request from the issuer and the secured connection is established between the two services. In some embodiments, this secured connection is formed via the use of QR codes as discussed above with reference to FIG. 4. In some embodiments, the issuer services sends the verifiable credential to the holder service. In some embodiments, the holder service accepts the credential and stores it in its wallet. In some embodiments, the holder service sends a confirmation back to the issuer. In some embodiments, the issuer service receives the confirmation. In some embodiments, the issuer service stores a record of the first transaction on the blockchain. For example, the record of the first transaction includes a DID of the issuer entity. In some embodiments, a verifier service sends a request to form a secured connection to a holder service with a proposal for a second transaction and for verification of credentials for the proposed second transaction. In some embodiments, the holder service receives the request for the second transaction from the verifier service and accepts the request. In some embodiments, a secured connection is established between the holder service and the verifier service. In some embodiments, the holder service prepares an attestation proof that includes claims from one or more credentials. For example, the attestation proof may be a compound proof that uses claims from multiple different credentials stored in the wallet of the holder entity. In some embodiments, the holder sends the attestation proof to the verifier via the use of a QR code (as discussed above with reference to FIG. 4). In some embodiments, the verifier service receives the proof and checks the issuer DID on the blockchain. In some embodiments, the verifier service also check the revocation registry on the blockchain to ensure that the DID of the issuer entity is valid. In some embodiments, the verifier service confirms receipt of the attestation proof to the holder service. In some embodiments, the holder service receives the confirmation and the second transaction proposed by the verifier service is complete.

Verification for Electronic Interactions

In some situations, during an electronic interaction with an end user, a third-party (verifier) entity needs to verify the end user prior to authorizing the electronic interaction. For example, the verifier entity may invoke and utilize a verification service as needed via the identity service 120 to verify a holder entity (end user) for an electronic interaction (a workflow-based process) without being required to download the verifier service 108. In various embodiments, the disclosed verification service allows entities acting as verifiers to send remote requests by calling into the verification service that allows the verifier entities to interact with a reduced subset of credentials to verify a holder entity for an action requested by the holder entity. For example, verification service may be utilized by any of various entities to verify a holder for a workflow-based process (online electronic transaction, in-person transaction, presentation of ticket and identity proof at an event, etc.) that requires verification of an end user's identity. Said another way, the disclosed verification service provides a more flexible and invokable service that can be utilized by multiple systems for various applications (e.g., verification service may be used by a merchant to verify a customer without having to download the verifier service 108 discussed above with reference to FIGS. 1 and 2).

The disclosed verification service may be utilized to verify end users for any of various purposes. For example, verification of an end user may be desired in situations in which rare items are being sold. In this example, an automated system or script (e.g., a robot) may attempt to purchase a large amount of rare items (with a limited amount of stock) online and then resell these rare items at a profit. In such situations, the merchant selling the rare items may utilize the disclosed verification service to verify that each individual purchasing an item from their website online is only allowed to complete a single transaction for a single item, for example. As another specific example, in order for a merchant to provide a veteran discount online to only those individuals qualifying for such a discount, the merchant may utilize the disclosed verification service to verify the age of such individuals.

In addition to providing a flexible, on-demand verification service, the disclosed techniques allow for verification of a user in a remote manner, without contacting the issuer of the user's identification information. While FIG. 4 illustrates secure communication of user data within a multi-sided network via the use of QR codes when users are within physical proximity, in some embodiments, users may not be located in the same physical location. The disclosed techniques provide a go-between verification service that facilitates communication between various entities operating within a multi-sided network during an online transaction process. For example, the disclosed verification service may be utilized in combination with the holder service 206 and the verifier service 208 but may be separate from these services. The disclosed techniques allow entities to utilize the services of system 200 (e.g., issuer service 204, holder service 206, and verifier service 208) in a virtual setting. For example, the techniques discussed below with reference to FIGS. 8-11 allow entities to securely communicate for a verification process without being required to scan codes (although the examples discussed below may be used in combination with scannable codes).

In some embodiments, the disclosed verification service facilitates virtual communication between a holder entity and a verifier entity for a verification process. The holder entity virtually communicates with the verifier entity via a user interface of the verifier entity that includes a call-to-action button selectable to initiate a verification process via the verification service. In disclosed techniques, the button is injected by a software development kit (SDK) (which may be referred to herein as a smart verification button (SVB)) downloaded from identity service 120 that includes the holder service and the verification service. The disclosed techniques further utilize a verification token (v-token) to complete a verification process in a virtual manner. For example, while verifier entities sometimes scan a QR code in person to perform a verification via identity service 120, the techniques discussed below with reference to FIGS. 8-11 provide a streamlined process that reduces or removes the need for in-person interaction. In one embodiment, the v-token may be a randomly generated string including numbers and characters (e.g., V-AKLL189ANC19AC) that uniquely identifies a verification session.

In one example workflow-based scenario, a holder browses an online catalog, selects an item for purchase, and initiates a checkout workflow by selecting to pay e.g., with PayPal. In this example, the holder logs into their PayPal account using their username and password and, in response, the merchant requires verification of identity claims of the user. Further in this example, the user selects one or more claims from verifiable credentials stored in their wallet and presents proofs of these credentials to the merchant who verifies the user via the disclosed verification service. If the verification process is successful, then the merchant may allow the user to complete the transaction they initiated to purchase the item that the user selected.

In some situations, repeated, similar verifications consume bandwidth. As such, the disclosed verification system performs a single verification for a given set of requirements and stores the result for use by multiple different verifier entities going forward. As one specific example, a holder entity may need to be verified by multiple different entities (e.g., merchants) and the verification requirements for these different entities may be the same or similar. In this example, instead of performing a verification for each of the different entities, the disclosed verification service performs a single verification and stores the result to be accessed by each of the different entities at their convenience. For example, the verification service may expose an application programming interface (API) which verifier entities can hit to obtain details for the verification process performed for the given holder entity. Such techniques may advantageously decrease the demands on computing resources and bandwidth of the server computer system executing the verification service.

Example Verification Service

Figure 8:
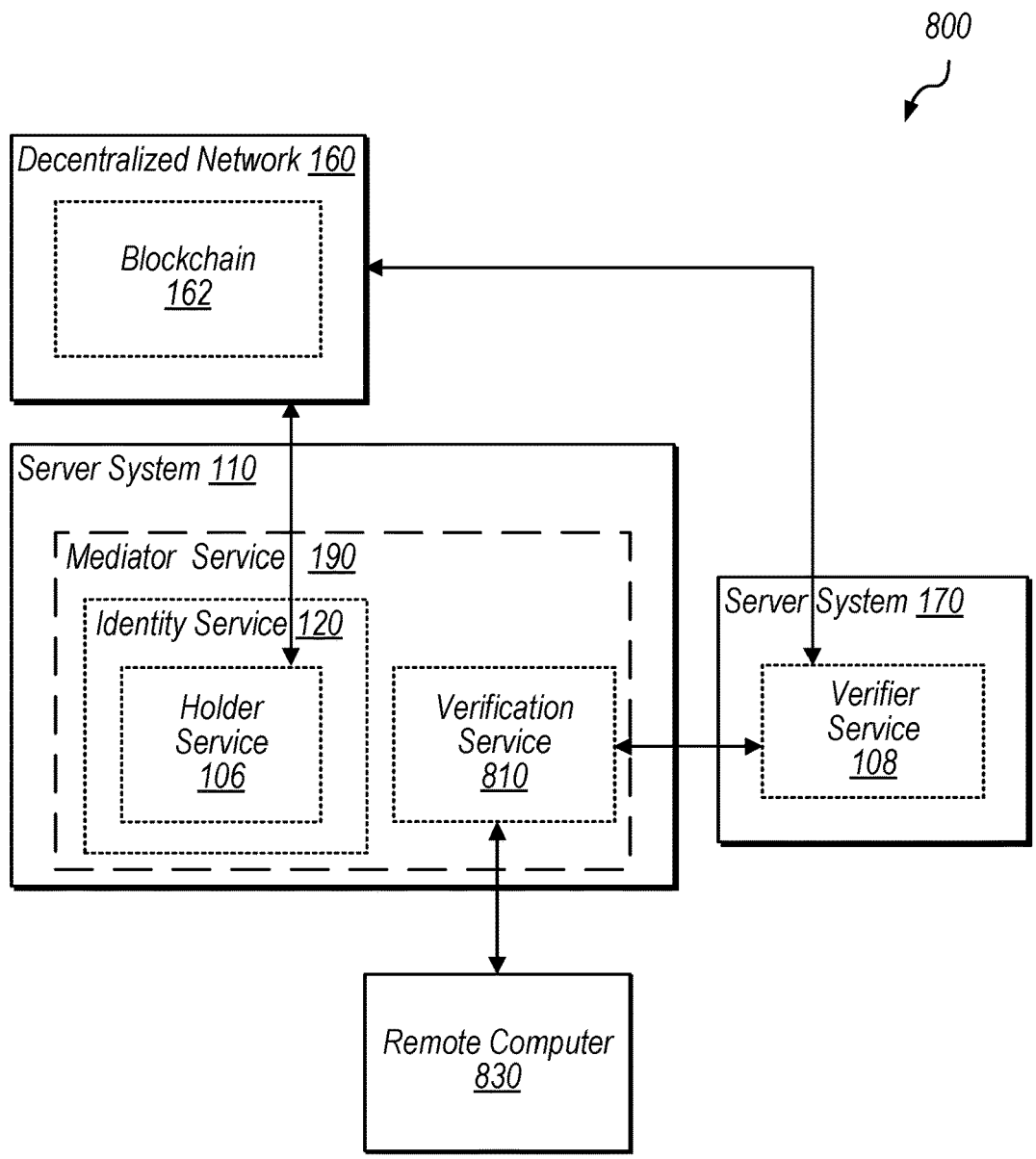
FIG. 8 is a block diagram illustrating an example verification service, according to some embodiments.

FIG. 8 is a block diagram illustrating an example verification service. In the illustrated embodiment, system 800 includes decentralized network 160 (which includes blockchain 162), server system 170 (which includes verifier service 108), server system 110 (which includes mediator service 190, identity service 120, holder service 106, and verification service 810), and remote computer 830.

Remote computer 830, in the illustrated embodiment, communicates with verification service 810 to complete a verification process facilitated by the identity service 120 via holder service 106, verification service 810, and verifier service 108. Verification service 810 is a service provided by an online processing system (such as PayPal). This service 810 serves as an internal verifier capable of communicating with existing services of the online processing system (e.g., features provided by existing PayPal services such as v-tokens, user details, webhooks, fraud detection, etc.) to utilize services provided by the online processing system without being required to download an application from the online processing system. As one specific example, a merchant may utilize verification service 810 to verify customers via their remote computer 830 without requiring these customers to download an application from server system 110 (a server of the online processing system). The disclosed verification service 810 integrates with existing services (e.g., existing services that are a part of PayPal's ecosystem). Verification service 810 facilitates communication between an end user and services provided by identity service 120 including holder service 106, verifier service 108, and identity service 104 (not shown). For example, verification service 810 is an internal PayPal service that facilitates communication during a verification session between a merchant, a consumer, and verifier service 108. In this example, when a consumer navigates to a merchant checkout page, they may be required to verify one or more aspects of their identity before they are able to complete a transaction with the merchant. This verification may be performed via verification service 810. As discussed in further detail below with reference to FIGS. 9-11, verification service 810 acts as a go-between service during a verification process to allow an end user to be verified for a verifier entity via the identity service 120 in an on-demand, remote manner.

Figure 9:
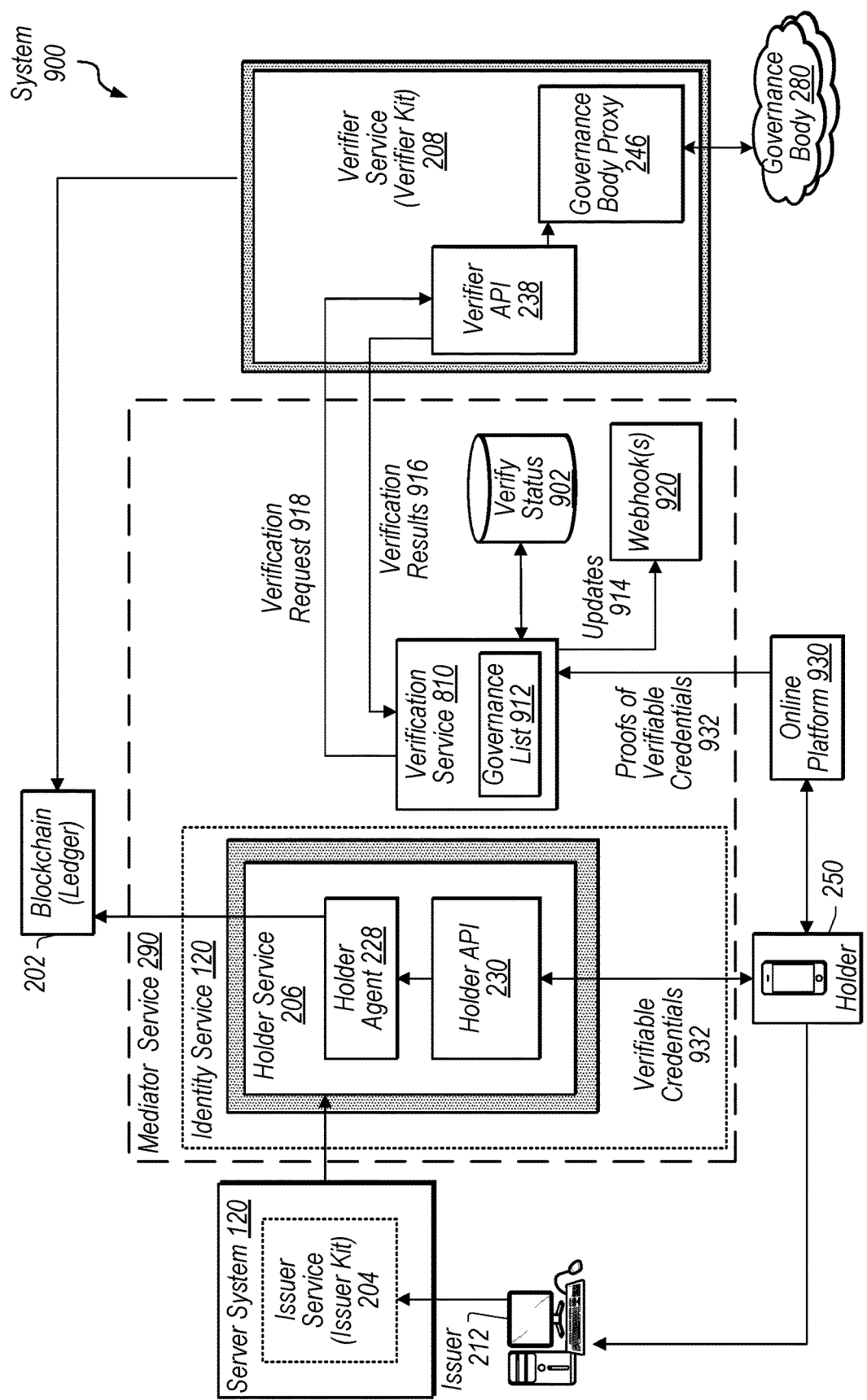
FIG. 9 is a block diagram illustrating an example verification service included in an identity service that is in communication with a verifier service, according to some embodiments.

FIG. 9 is a block diagram illustrating an example verification service included in an identity service that is in communication with a verifier service. In the illustrated embodiment, mediator service 290 includes identity service 120, verify status database 902, webhook(s) 920, and verification service 810, which in turn includes a list 912 of governance bodies.

A holder entity (an end user) visits a webpage of a verifier entity via their device 250 and requests an action to be performed by (initiates an electronic interaction with) the verifier entity. In response, the verifier entity prompts the user to approve a verification process to be performed via identity service 120. Based on the user approving the verification process and specifying less than an entirety of one or more verifiable credentials stored in a wallet of the holder to be used for the verification process, the verifier webpage at holder device 250 sends a request to online platform 930 to initiate a verification process. For example, an amount of identification information for the holder needed to complete a verification may be shared during the verification process. In some situations, this amount of identification information is referred to as a zero knowledge proof. For example, holder service 206 maintains a wallet for the holder entity that facilitates either online or offline storage of holder credentials (e.g., a social security card of the holder). Holder API 230, included in holder service 206, facilitates the transfer of proofs from verifiable credentials of the holder that are stored in the wallet of the holder entity. The request includes an attestation proof 932 of the verifiable credentials and one or more corresponding issuer DIDs. Online platform 930 transmits the attestation proof 932 e.g., generated from less than the entirety of verifiable credentials and the issuer DIDs to verification service 810.

Verification service 810 sends a verification request 918 including an attestation proof 932 of verifiable credentials and the issuer DIDs to verifier service 208 to perform a verification of the holder entity for the verifier entity. Verifier service, 208, in the illustrated embodiment, uses an issuer DID received with the verifiable credentials from the verification service 810 to look up an issuer associated with the credentials via blockchain 202. For example, verifier service 208 determines whether the credentials have been revoked by an issuer associated with them by checking a revocation registry stored on the blockchain 202 against the received issuer DIDs. If the credentials have not been revoked, then verifier service 208 checks the issuer DID against a governance body 280 via governance body proxy 246 to determine whether the issuer is legitimate (e.g., whether credentials issued by this issuer should be trusted). For example, prior to the verifier service generating the verification results, the verifier service 208 verifies that the one or more issuer DIDs received from the verification service 810 match a predetermined set of issuers maintained by one or more governance entities. After verifying the issuer against one or more governance bodies 280, verifier service 208 sends a verification result 816 to verification service 810.

Even though verifier service 208 performed the verification of the holder entity via the blockchain 202, verification service 810 confirms that the verifier service 208 is compliant with a list 912 of governance bodies maintained and approved by the online platform 930 (e.g., PayPal). List 912 may be a subset of the set of governance bodies 280 accessed by governance body proxy 245. Verification service 810 will ensure that results 916 provided by verifier API 238 have been verifier using one or more governance bodies included in the approved list 912. For example, if the verifier service 208 did indeed verify the holder entity credentials against a trustworthy issuer entity, then the verification results are trusted. As one specific example, if PayPal trusts governance body A and governance body B to store accredited issuer DIDs, governance bodies A and B will be included in list 912 of governance bodies that are approved by the online platform. In this specific example, when a merchant utilizes verification service 810 to verify a user, the merchant will send a verification request that includes verifiable credentials and an issuer DID of company A to verification service 810. Further in this example, verification service 810 will pass the verification request 918 to verifier service 208. In this example, verifier service 208 ensures that the issuer DID included in verification request 918 is legitimate using governance body proxy 245. If the issuer DID is legitimate, then verifier service 208 performs a verification of the verifiable credentials included in request 918. In this example, verifier service 208 will send verification results 916 (e.g., indicating pass or fail) and a governance body used to verification service 810. In this example, verification service 810 confirms that the governance body used by verifier service 208 was valid by checking it against governance list 912.

Verification service 810, in the illustrated embodiment, sends updates 914 to one or more webhooks 920 based on the verification result 916. Webhook(s) 920 may be services, for example, that are utilized by verification service 810 to send updates for verification statuses to verifier entities (e.g., merchants). In addition, based on results 916, verification service 810 updates a verification status for the verification by updating a verification status stored in verify status database 902 that corresponds to the verification session.

As one specific example, the verification process facilitated by verification service 810 may be necessary when a workflow requires verification of an individual. For example, if an online merchant (a verifier entity) offers a discount (e.g., to senior citizens) transactions involving such discounts may require additional verification of the individual (a holder entity) requesting the transactions (e.g., to verify that they are indeed a senior citizen). In such situations, the verification service 810 is called during the transaction workflow via a verification button that is instantiated during the transaction workflow. Depending on rules specified by a verifier entity for an identity verification (e.g., the user initiating the transaction must be at least 65 years old), the disclosed holder service 206 builds a proof for the holder entity for the verification process using one or more verifiable credentials stored for the holder. In some situations, this proof is a compound proof built using multiple verifiable credentials of the holder. If the proof is approved during the verification process according to rules specifies by the verifier entity for the transaction, then the verification is successful and the transaction may proceed. Otherwise, the verification process may return an error, indicating that the verification process failed.

Figure 10:
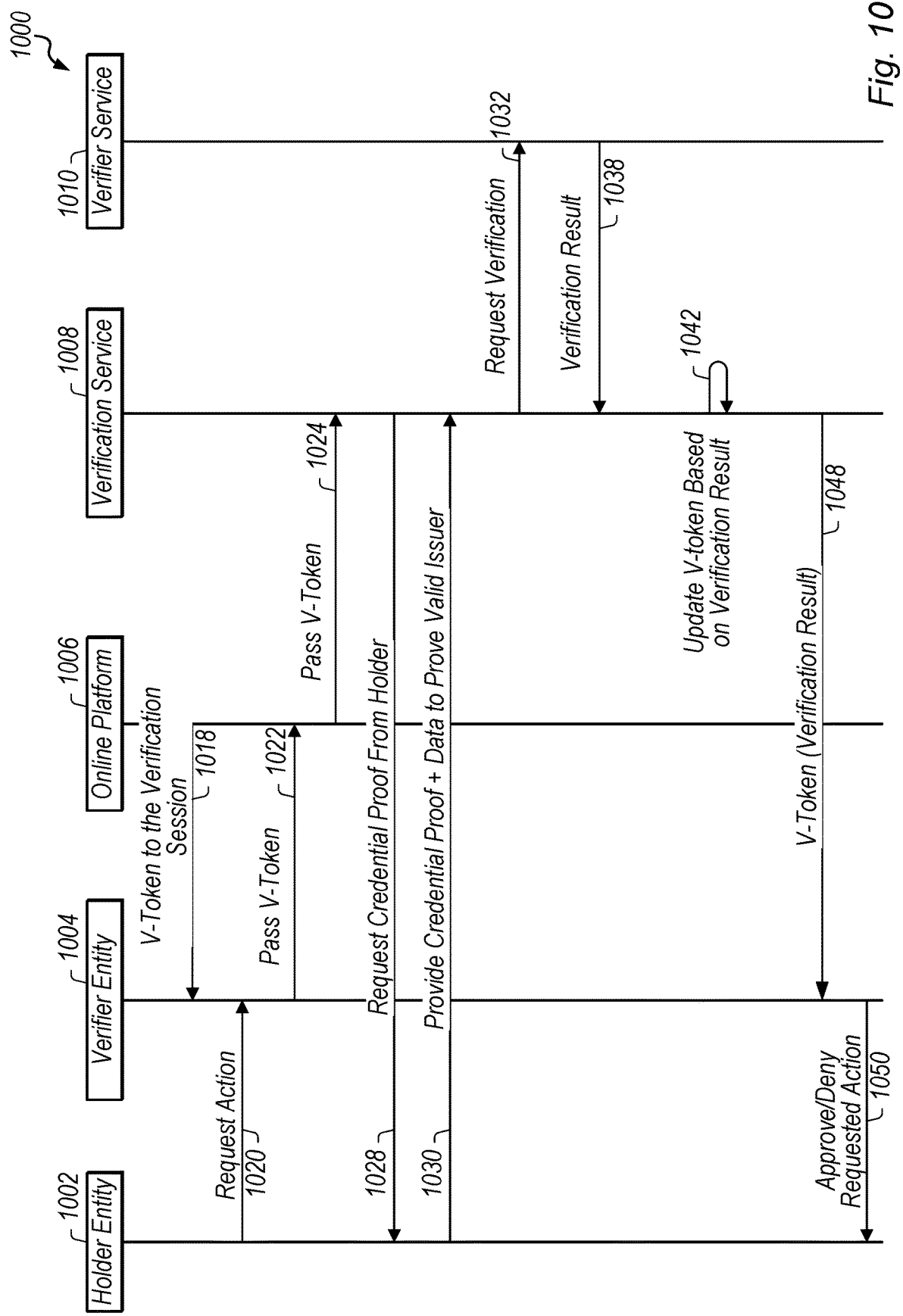
FIG. 10 is a communication diagram illustrating interactions between a verification service and different entities in a multi-sided network for verification of a holder for a requested action, according to some embodiments.

FIG. 10 is a communication diagram illustrating interactions between a verification service and different entities in a multi-sided network for verification of a holder for a requested action. In the illustrated embodiment, a holder entity 1002 sends a request 1020 for an action to a verifier entity 1004. In response to the request, verifier entity 1004 initiates a verification process by communicating with an online platform 1006 to receive a v-token for a verification session. Online platform 1006 generates a unique v-token for the verifier entity based on an identifier of the verifier entity. Verifier entity 1004 then sends the v-token 1022 to online platform 1006 at 1022, which in turn sends the v-token to verification service 1008 at 1024. In disclosed embodiments, a v-token is a unique identifier that represents a verification instance (process) for a given workflow being executed between a holder entity and a verifier entity (e.g., for an electronic interaction initiated by a user). This v-token indicates whether the verification instance is e.g., pending, possibly successful, successful, denied, etc.

Verification service 1008, in the illustrated embodiment, sends a request 1028 for credential proof to holder entity 1002 via a holder service (e.g., holder service 106). At element 1030, the holder entity 1002, via the holder service, provides credential proof and a credential definition ID (DID) or an issuer DID of an issuer service corresponding to one or more credentials included in the proof to verification service 1008. For example, the credential definition ID or issuer DID may be referred to as restrictions. A user (holder) may send credential proofs that includes restrictions (an issuer DID or credential definition ID). These restrictions are usable to determine whether an issuer entity corresponding to the one or more credentials is a valid and trusted issuer. In response to receiving the credentials from the holder, verification service 1008 sends a request 1032 for verification to verifier service 1010. Request 1032 includes the credential proof and issuer DID. After performing a verification of the credential proof provided by the holder entity via blockchain using the issuer DID, verifier service 1010 sends verification result 1038 to verification service 1008. At element 1042, verification service 1008 updates the v-token based on the verification result 1038. At element 1048, verification service 1008 sends the v-token (e.g., indicating the verification result) to verifier entity 1004. Based on the result indicated in the v-token, verifier entity 1004 sends an authorization decision 1050 to holder entity 1002 via the holder service. The authorization decision 1050 indicates whether the requested action is approved or denied.

Figure 11:
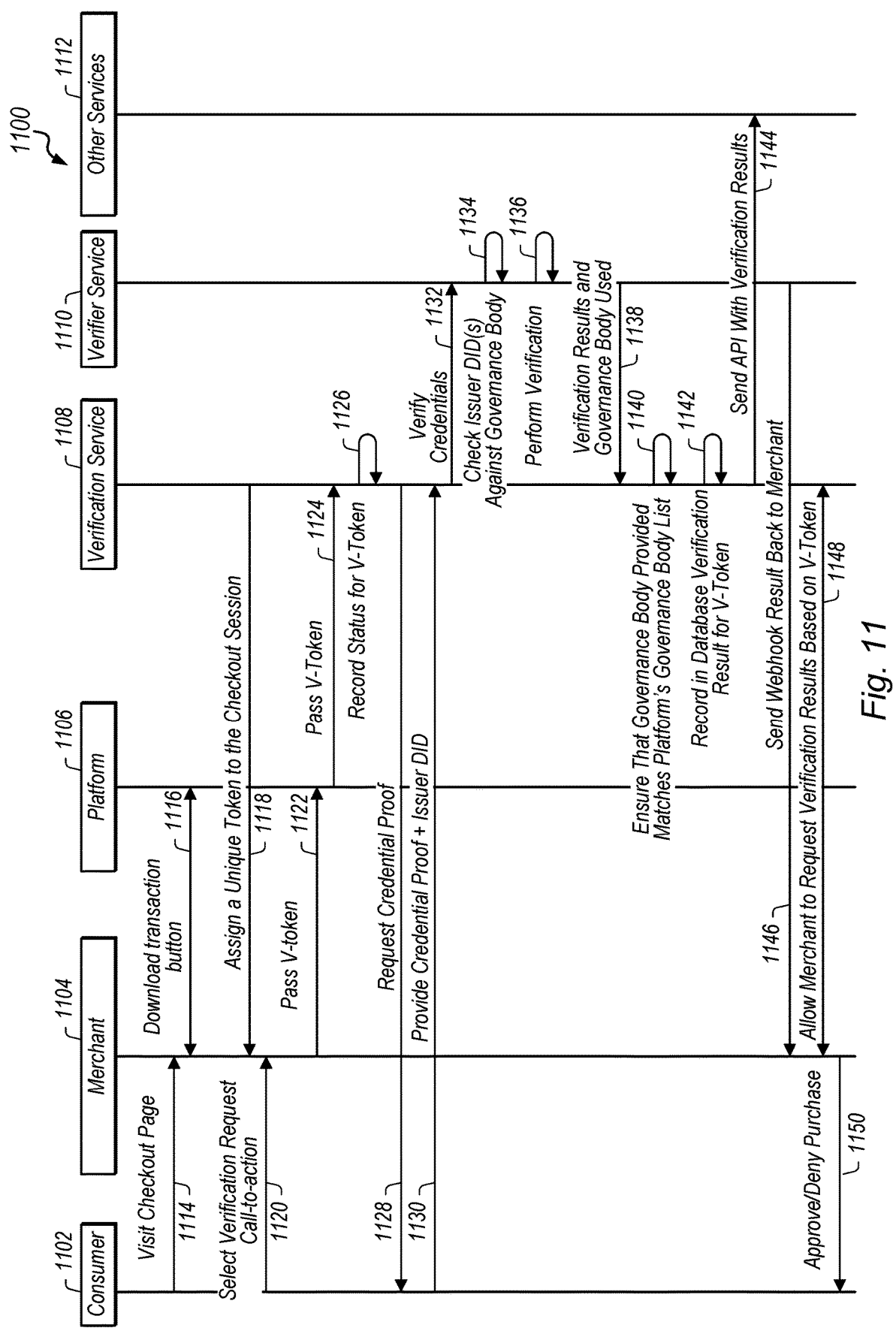
FIG. 11 is a communication diagram illustrating interactions between a verification service and different entities in a multi-sided network for verification of a holder for an electronic interaction, according to some embodiments.

FIG. 11 is a communication diagram 1100 illustrating interactions between a verification service and different entities in a multi-sided network for verification of a holder for an electronic interaction. In the illustrated embodiment, a consumer 1102 visits a merchants page 1104 (e.g., a checkout webpage) at element 1114. At element 1116, in response to the consumer visiting their page, the merchant downloads a payment button from an online processing platform 1106 (e.g., an online transaction processing (OLTP) platform such as PayPal). For example, merchant page 1104 downloads an SDK that includes a verify button that is injectable into the merchant's page from the platform 1106.

At element 1118, the SDK downloaded on platform 1106 uses a client identifier (ID) of the merchant to fetch a v-token. For example, verification service 1108 generates and assigns a v-token to the merchant based on their client ID. The merchant stores the v-token for use during a verification process. In response to the consumer requesting to initiate a transaction (e.g., by clicking a "checkout" button at the merchant's checkout page), the merchant website displays a verification request call-to-action button to the consumer. For example, in order for the merchant to proceed with processing a transaction requested by the consumer, the merchant needs to confirm with the platform that the consumer has been verified (e.g., the consumer is who they say they are). At element 1120, the consumer clicks on the verification request call-to-action to initiate a verification process with the merchant. At element 1122, in response to the consumer clicking on the call-to-action button, the merchant webpage passes the v-token to platform 1106. For example, the SDK at the merchant's website detects that the user has clicked on the "verify" button displayed at the merchant's checkout page. At element 1124, the platform 1106 passes the v-token to the verification service 1108 requesting verification of the consumer 1102.

At element 1126, in the illustrated embodiment, verification service 1108 records the current status of the verification session and the v-token. For example, verification service 1108 may store the v-token with a status indicator of "pending." At element 1128, verification service 1108 requests credential proof from the consumer via the holder service 106. At 1130, the consumer 1102 provides credential proof (e.g., generated using less than an entirety of one or more credentials, a portion of one or more credential, an entirety of one or more credentials, etc.) and one or more corresponding issuer DIDs to verification service 1108. In some embodiments, consumer 1102 denies the request for credentials received from verification service at 1128 and the verification session terminates. At 1132, verification service 1108 sends a request to verifier service 1110 to verify the consumer 1102 using the provided credentials and issuer DID(s).

At 1134, in the illustrated embodiment, verification service 1110 checks the one or more issuer DIDs received from verification service against a list of valid issuer entities maintained by one or more governance bodies. For example, verifier service 1110 will ensure that one or more issuers associated with the received issuer DID(s) match an approved issuer entity listed by a governance body as approved and authentic.

At element 1136, verifier service performs verification of the consumer based on the received credentials. For example, verifier service 1110 may look up the received credentials via a blockchain using the one or more issuer DIDs to determine whether these credentials are still valid (have not been revoked) and whether the one or more issuers associated with the DIDs are indeed valid (e.g., included on a list of approved governance bodies). After verifying the validity of the provided credentials, verifier service 1110 determines whether the provided credentials satisfy one or more requirements of the merchant (e.g., is this user at least 25 years old?). At element 1138, verifier service 1110 provides, to verification service 1108, verification results and a governance body used to verify the one or more issuer entities corresponding to the issuer DIDs at element 1134.

At element 1140, verification service 1108 ensures that the governance body used by verifier service 1110 matches an approved list of governance bodies provided by platform 1106. At element 1142, verification service 1108 records a verification result for the v-token in a database. For example, verification service 1108 may update a record in a database storing verification session information to indicate the status associated with the given v-token passed at element 1124 from "pending" to "verified" or "not verified." Further, verification service 1108 at element 1144 will publish and expose an application programming interface (API) for one or more other verifiers (e.g., other merchants) to hit to get details for the verification performed for the verification session initiated by consumer 1102 at 1120. At element 1146, verifier service 1110 sends a webhook with the verification result back to the merchant 1104. For example, the webhook may be sent out using an existing PayPal webhook mechanism or service.

At element 1148, verification service 1108 allows a merchant to request verification results based on the v-token. For example, the merchant may send a v-token to verification service 1108 and the verification service sends verification results corresponding to the v-token. Verification service 1108 may store verification results for various different verification sessions with their respective v-tokens for retrieval by one or more verifier entities (e.g., merchants) at a later time. At element 1150, the merchant 1104 determines whether to approve or deny a transaction request from consumer 1102 based on the verification results received from verification service 1108 at element 1148. For example, merchant 1104 may approve and authorize a transaction initiated by the consumer based on the verification results indicating that verification of the consumer 1102 was successful.

In various embodiments, verification service 1108 is executable by a server computer system to accept v-tokens from verifier entities as well as to collaborate with other online services (e.g., PayPal services involved in processing a transaction, including payments services, fraud detection or prevention services, etc.) to obtain attestation proofs generated from user credentials for verification processes. In some embodiments, verification service 1108 enables verifier entities to check on verification results via a webhook. In other embodiments, verification service 1108 enables verifier entities to check on verification results via an API. Further, verification service 1108 maintains a list of governance bodies. For example, this list includes governance bodies that verifier service 1110 is expected to use during a verification process. As one specific example, in order for verification service 1108 to accept a set of verification results from verifier service 1110, the governance body used by verifier service 1110 must be included on the list of governance bodies maintained by verification service 1108.

Figure 12A:
FIGS. 12A-12D are example user interfaces displayed to a holder entity during a verification process for an electronic interaction, according to some embodiments.

FIGS. 12A-12D illustrate example user interfaces displayed to a holder entity during a verification process for an electronic interaction. In FIG. 12A, example initiation of a verification session 1200 is shown. In the illustrated embodiment, holder device 1250 displays a user interface 1252 to a holder in response to the holder asking to initiate a transaction. For example, the holder may select a "checkout" button displayed at a merchant webpage to initiate an electronic transaction. In response to the holder selecting the button, the merchant website displays a verification invitation webpage (one example of user interface 1252) to the holder. For example, user interface 1252 tells the holder to accept an invitation from a verifier entity (e.g., a merchant) to verify their identity for the requested transaction. If the holder selects the "accept verification invitation" button, then the holder device displays user interface 1254 shown in FIG. 12B to the holder.

Figure 12B:
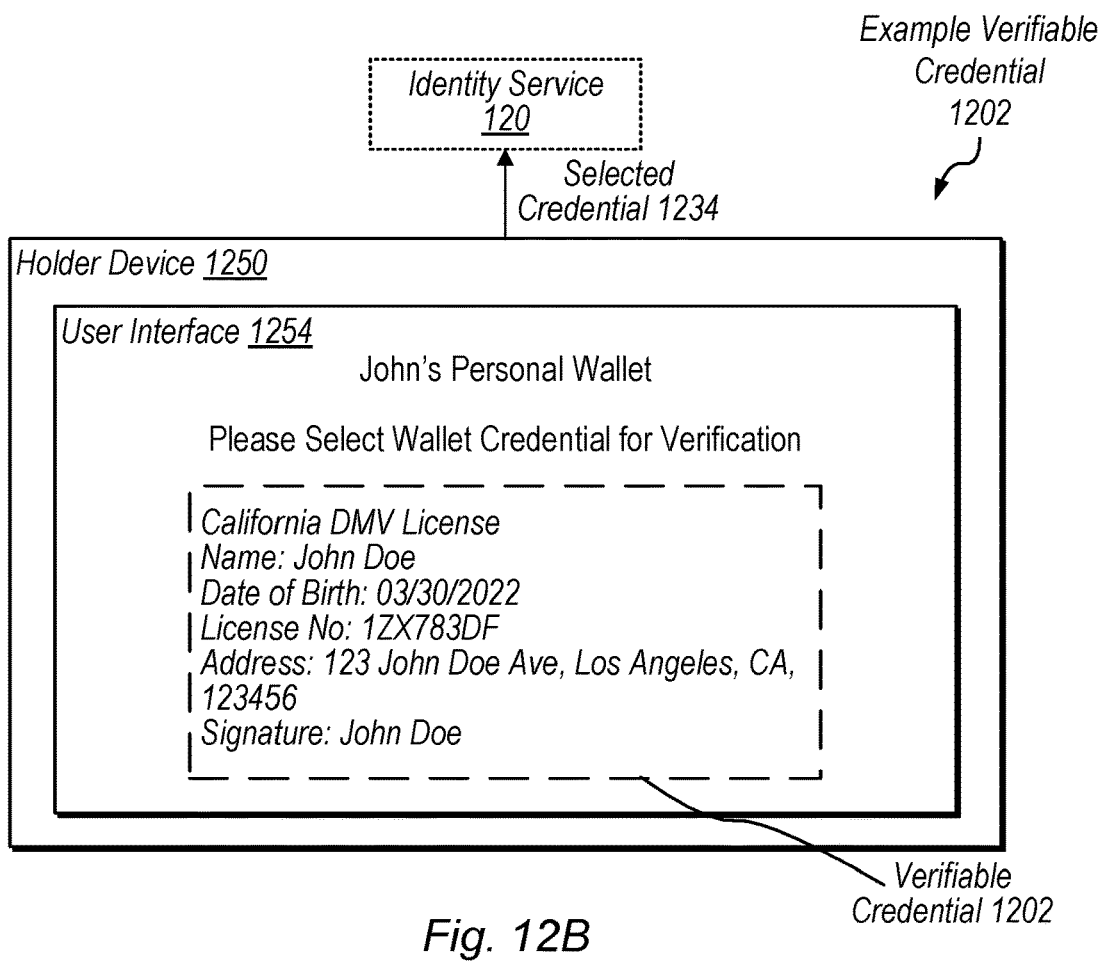

In FIG. 12B, an example verifiable credential 1202 is shown to a holder via user interface 1254. In the illustrated embodiment, verifiable credential 1202 is a driver's license for John Doe (the holder). This verifiable credential 1202 is stored by a holder service (e.g., holder service 106) in an identity storage (such as a wallet stored on the holder device 1250) for the holder. In various embodiments, multiple different verifiable credentials stored in the holder's wallet may be displayed via user interface 1254 for selection by the holder for a verification process. For example, user interface 1254 may display a birth certificate, a diploma, a mortgage contract, a social security card, etc. In the illustrated embodiment, user interface prompts the holder to select a claim from the credential from their wallet for the verification process. In response to the holder (John Doe) selecting their California DMV license, holder device 1250 displays the user interface 1256 shown in FIG. 12C.

Figure 12C:
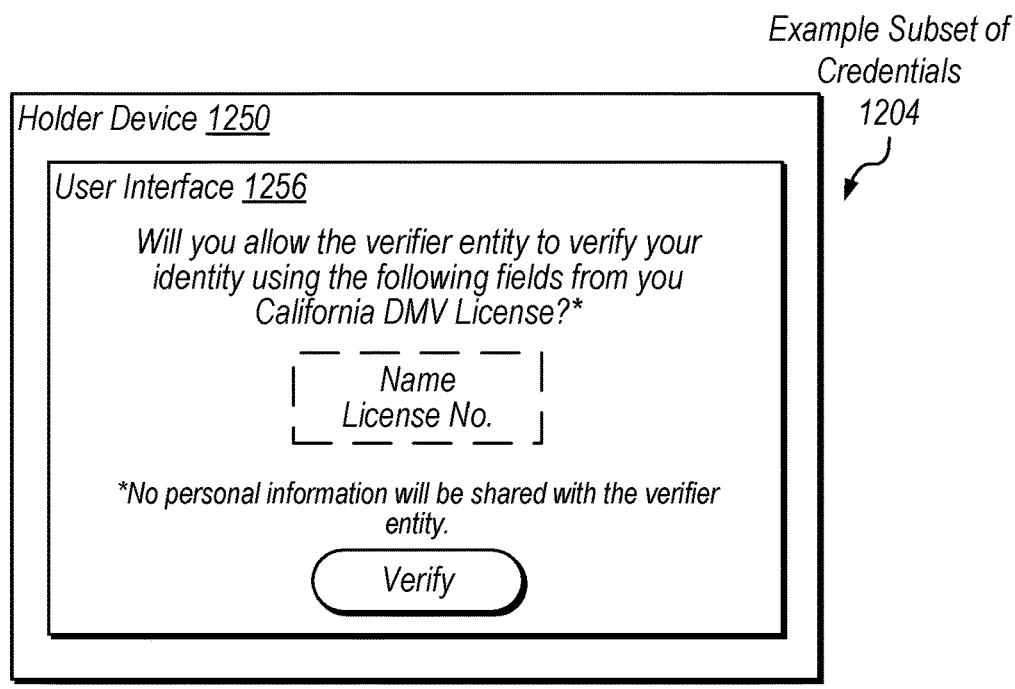
Figure 12D:

In FIG. 12C, an example subset of one or more verifiable credentials 1204 is shown. In the illustrated embodiment, user interface 1256 asks the holder whether they will allow the verifier entity to verify the holder using two fields or claims (i.e., a subset of verifiable credentials 1202) from their California DMV license. For example, holder service 106 may select the name field and license number from their driver's license for use in a verification process based on one or more verification requirements indicated by the verifier entity (e.g., the merchant). If the holder would like to proceed with the verification process using the two fields indicated in user interface 1256, the holder may select the "verify" button.

In response to the holder selecting the verify button, the verification service 810 transmits a proof generated from the subset of holder credentials (the two fields from the driver's license) to verifier service 108 for verification. Verifier service 108 sends verification results back to verification service 810 which are then transmitted to the verifier entity (e.g., the merchant). Based on these verification results, the verifier entity may display, via holder device 1250, the user interface 1258 shown in FIG. 12D. For example, if the verification was successful, the verifier entity may allow the holder to proceed with the transaction they initiated which triggered the verification process. In the illustrated embodiment, example verification results 1206 are shown indicating that the verification was successful. The holder is then provided with the option to confirm the transaction they originally initiated with the verifier entity. In other situations, even though the verification process was successful, the holder entity may choose to abort the transaction (e.g., user interface 1258 may display a "cancel transaction" button to the holder).

Example Method

FIG. 13 is a flow diagram illustrating a method for verifying a holder entity on behalf of a verifier entity for an action requested by the holder entity, according to some embodiments. The method 1300 shown in FIG. 13 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The elements of FIG. 13 may be performed by the verification service 820 of server system 800.

At 1310, in the illustrated embodiment, a verification service executing on a server computer system receives, for a verification session for verifying a holder entity on behalf of a verifier entity, a verification request from a remote computer system, the verification request including an attestation proof generated from one or more credentials. In some embodiments, the verification service communicates with a holder service that manages an identity storage that stores the one or more credentials for the holder entity. In some embodiments, the verification request further includes one or more issuer decentralized identifiers (DIDs) corresponding to the one or more credentials, where the verification service further transmits the one or more issuer DIDs to the verifier service, and where the one or more credentials are verifiable by the verifier service via a blockchain using the one or more issuer DIDs.

In some embodiments, the attestation proof is received based on the holder service determining a least amount of holder data that will satisfy a set of identification requirements specified in the verification request received from the verifier entity. In some embodiments, the attestation is received based on the holder service generating, based on the determining, a reduced subset of the set of holder data and then receiving, from the holder entity, approval to share the reduced subset of the set of holder data. In some embodiments, prior to requesting holder credentials from the holder entity, the verification service generates the v-token for the verification session, where the v-token is generated by the verification service in response to detecting, at a user interface associated with the verifier entity, input from the holder entity. In some embodiments, the verification service records, using the v-token, a status of the verification session initiated by the input from the holder entity. In some embodiments, prior to updating the status of the verification session, determining, by the verification service, whether a governance entity specified in the verification results received from the verifier service match one of a set of predetermined governance entities.

In some embodiments, the one or more credentials of the holder entity are received from at least one issuer entity, where the holder service included in the identity service and utilized by the holder entity receives the one or more credentials by causing, via a user interface of a holder device of the holder entity, display of a scannable code. In some embodiments, the holder service receives the one or more credentials by, in response to the scannable code being scanned by an issuer device of the issuer entity, establishing a secure connection between the holder device and the issuer device, where the secure connection is a pairwise DID. In some embodiments, the holder service receives the one or more credentials by causing transmission of at least one of the one or more credentials from the issuer device to the holder device via the secure connection.

At 1320, in the illustrated embodiment, the verification service transmits, to a verifier service, the attestation proof. In various embodiments, the verification service facilitates online communication between the holder entity and the verifier entity, and where the holder entity communicates with the verifier entity via a user interface of the verifier entity that includes an element that is selectable to initiate the verification session. In some embodiments, the selectable element is injected by a software development kit (SDK) downloaded by the verifier entity from an identity service that includes the holder service and the verification service. In some embodiments, in response to the holder entity selecting the selectable element the SDK retrieves, using a unique identifier (ID) of the verifier entity, a verification token (v-token) from the verification service.

At 1330, in the illustrated embodiment, the verification service receives, from the verifier service based on the transmitted attestation proof, verification results. In some embodiments, the verification results are usable by the verifier entity to determine whether to process an action requested by the holder entity prior to initiating the verification session. In some embodiments, in response to receiving the verification results, updating, by the verification service, a verification token (v-token) to indicate a status of the verification session, where the v-token is accessible to the verifier entity to determine the verification results for the holder entity. In some embodiments, the v-token is further accessible to one or more other verifier entities to determine verification results for the holder entity for one or more other verification sessions having verification requirements overlapping with the verification requirements of the verification session for which the v-token was generated. In some embodiments, prior to the verifier service generating the verification results, the verifier service verifies that one or more issuer DIDs corresponding to the one or more credentials and received from the verification service match a predetermined set of issuers maintained by one or more governance entities.

In some embodiments, the verification service transmits, to the verifier entity, a webhook that includes the verification results, where the action requested by the holder entity is a request for an electronic interaction, and where the verifier entity authorizes the electronic interaction based on the verification results. In some embodiments, the verification service and the holder service are included in an identity service. In some embodiments, an issuer service included in the identity service sends, to the holder entity via the holder service, the one or more credentials for storage. In some embodiments, the issuer service writes, to a blockchain for respective ones of the one or more credentials, a DID of an issuer entity, a schema of respective ones of the one or more credentials, and a public key. In some embodiments, adds, to a revocation registry of the blockchain for respective ones of the one or more credentials, entries specifying whether the one or more credentials have been revoked.

Example Computing Device

Figure 14:
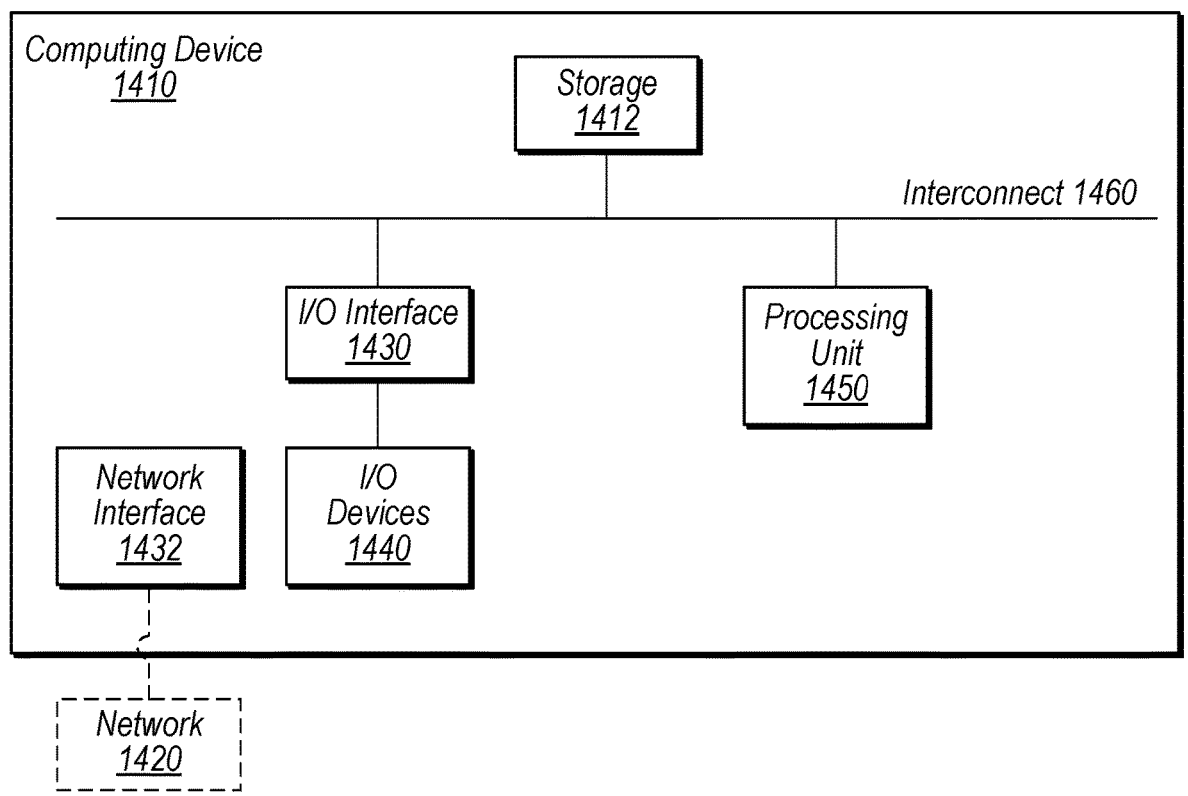
FIG. 14 is a block diagram illustrating an example computing device, according to some embodiments.

Turning now to FIG. 14, a block diagram of one embodiment of a computing device (which may also be referred to as a computing system) 1410 is depicted. Computing device 1410 (e.g., server system 110, server system 122, server system 170, issuer device 130, verifier device 140, holder device 150, etc.) may be used to implement various portions of this disclosure. Computing device 1410 may be any suitable type of device, including, but not limited to, a personal computer system, desktop computer, laptop or notebook computer, mainframe computer system, web server, workstation, or network computer. As shown, computing device 1410 includes processing unit 1450, storage 1412, and input/output (I/O) interface 1430 coupled via an interconnect 1460 (e.g., a system bus). I/O interface 1430 may be coupled to one or more I/O devices 1440. Computing device 1410 further includes network interface 1432, which may be coupled to network 1420 for communications with, for example, other computing devices.

In various embodiments, processing unit 1450 includes one or more processors. In some embodiments, processing unit 1450 includes one or more coprocessor units. In some embodiments, multiple instances of processing unit 1450 may be coupled to interconnect 1460. Processing unit 1450 (or each processor within 1450) may contain a cache or other form of on-board memory. In some embodiments, processing unit 1450 may be implemented as a general-purpose processing unit, and in other embodiments it may be implemented as a special purpose processing unit (e.g., an ASIC). In general, computing device 1410 is not limited to any particular type of processing unit or processor subsystem.

Storage subsystem 1412 is usable by processing unit 1450 (e.g., to store instructions executable by and data used by processing unit 1450). Storage subsystem 1412 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1412 may consist solely of volatile memory, in one embodiment. Storage subsystem 1412 may store program instructions executable by computing device 1410 using processing unit 1450, including program instructions executable to cause computing device 1410 to implement the various techniques disclosed herein.

I/O interface 1430 may represent one or more interfaces and may be any of various types of interfaces configured to couple to and communicate with other devices, according to various embodiments. In one embodiment, I/O interface 1430 is a bridge chip from a front-side to one or more back-side buses. I/O interface 1430 may be coupled to one or more I/O devices 1440 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method executed by a server system that includes a verification service, the method comprising:
    transmitting, by the server system to a remote computer system, an attestation proof of one or more holder credentials of a holder entity for a verification session initiated by the holder entity;
    receiving, by the verification service from the remote computer system, a verification request to verify the holder entity on behalf of a verifier entity, wherein the verification request includes the attestation proof;
    transmitting, by the verification service to a verifier service, a verify request to verify the holder entity, wherein the verify request includes the attestation proof;
    receiving, by the verification service from the verifier service, a response to the verify request that includes verification results;
    in response to receiving the verification results, updating, by the verification service, a verification token (v-token) stored in a database of the server system to indicate a status of the verification request; and
    exposing, by the verification service after the updating, an application programming interface (API) callable by a plurality of different entities to retrieve the v-token stored in the database.

2. The method of claim 1, further comprising:
    receiving, by the verification service from the verifier entity, a request to access verification results corresponding to the v-token; and
    in response to receiving the request, the verification service transmitting to the verifier entity, the verification results for the holder entity corresponding to the v-token.

3. The method of claim 1, further comprising:
    receiving, by the verification service from one or more other verifier entities, a request to access the verification results for the holder entity corresponding to the v-token; and
    transmitting, by the verification service to the one or more other verifier entities, the verification results for one or more other verification sessions initiated by the holder entity and having verification requirements overlapping with the verification requirements of the verification session for which the v-token was generated.

4. The method of claim 1, wherein the verification request further includes one or more issuer decentralized identifiers (DIDs) corresponding to the one or more holder credentials, wherein the verification service further transmits the one or more issuer DIDs to the verifier service, and wherein the one or more holder credentials are verifiable by the verifier service using the one or more issuer DIDs.

5. The method of claim 1, further comprising prior to transmitting the attestation proof to the remote computer system:

generating, by the verification service, the v-token indicating a status of the verification session initiated by the holder entity.

6. The method of claim 5, wherein the v-token is generated by the verification service in response to detecting, at a user interface associated with the verifier entity, input from the holder entity.

7. The method of claim 1, wherein the holder entity communicates with the verifier entity via a user interface of the verifier entity that includes an element that is selectable to submit the verification request, and wherein the selectable element is injected by a software development kit (SDK) downloaded by the verifier entity.

8. The method of claim 1, further comprising:
transmitting, by the verification service to the verifier entity, a webhook that includes the verification results, wherein the verification results are usable by the verifier entity to determine whether to process an action requested by the holder entity, and wherein the action requested by the holder entity is a request for an electronic interaction; and
receiving, by the verification service from the verifier entity, an authorization of the electronic interaction based on the verification results.

9. A non-transitory computer-readable medium having program instructions stored thereon that are executable by a verification service and a holder service executing on an electronic transaction processing system to perform operations comprising:
transmitting, to a remote computer system, an attestation proof of one or more holder credentials of a holder entity for a verification session initiated by the holder entity requesting to initiate an electronic transaction;
receiving, by the verification service from the remote computer system, a verification request to verify the holder entity on behalf of a verifier entity, wherein the verification request initiates a verification session and includes the attestation proof;
transmitting, by the verification service to a verifier service, a verify request to verify the holder entity, wherein the verify request includes the attestation proof;
receiving, by the verification service from the verifier service, a response to the verify request that includes verification results;
in response to receiving the verification results, updating, by the verification service, a verification token (v-token) stored in a database of the processing system to indicate a status of the verification request; and
exposing, by the verification service after the updating, an application programming interface (API) callable by a plurality of different entities to retrieve the v-token stored in the database.

10. The non-transitory computer-readable medium of claim 9, wherein the operations further comprise:
receiving, by the verification service from one or more other verifier entities, a request to access the verification results for the holder entity corresponding to the v-token; and
transmitting, by the verification service to the one or more other verifier entities for one or more other verification sessions initiated by the holder entity and having verification requirements overlapping with the verification requirements of the verification session for which the v-token was generated.

11. The non-transitory computer-readable medium of claim 10, wherein the verification service generates the v-token in response to detecting, at a user interface associated with the verifier entity, input from the holder entity; and
recording, by the verification service using the v-token, a status of the verification session initiated by the input from the holder entity.

12. The non-transitory computer-readable medium of claim 10, wherein the operations further comprise:
prior to updating the status of the verification session, determining, by the verification service, whether a governance entity specified in the verification results received from the verifier service match one of a set of predetermined governance entities.

13. The non-transitory computer-readable medium of claim 9, wherein the holder entity communicates with the verifier entity via a user interface of the verifier entity that includes an element that is selectable to initiate the verification session, wherein the selectable element is injected by a software development kit (SDK).

14. The non-transitory computer-readable medium of claim 13, wherein in response to the holder entity selecting the selectable element the SDK retrieves, using a unique identifier (ID) of the verifier entity, the verification token (v-token) from the verification service.

15. The non-transitory computer-readable medium of claim 9, wherein the attestation proof transmitted to the remote computer system includes one or more holder credentials that satisfy a least amount of holder credentials and a set of identification requirements specified in the verification request.

16. A system, comprising
a verification service;
a non-transitory memory having instructions stored thereon that are executable by the verification service to perform operations including:
transmitting, to a remote computer system, an attestation proof of one or more holder credentials of a holder entity for a verification session initiated by the holder entity requesting to initiate an electronic transaction with a verifier entity;
receiving, for a verification session for the holder entity, a verification request from the remote computer system, wherein the verification request includes the attestation proof;
transmitting, to the verifier service, a verify request to verify the holder entity, wherein the verify request includes the attestation proof;
receiving, from the verifier service based on the attestation proof, a response to the verify request that includes verification results;
in response to receiving the verification results, updating a verification token (v-token) stored in a database of the system to indicate a status of the verification request; and
exposing, by the verification service after the updating, an application programming interface (API) callable by a plurality of different entities to retrieve the v-token stored in the database.

17. The system of claim 16, wherein the operations further include:
receiving, from one or more other verifier entities, a request to access the verification results for the holder entity corresponding to the v-token; and
transmitting, to the one or more other verifier entities, the verification results for one or more other verification sessions initiated by the holder entity and having verification requirements overlapping with the verification requirements of the verification session for which the v-token was generated.

18. The system of claim 17, wherein the v-token is further accessible to one or more other verifier entities to determine verification results for the holder entity for one or more other verification sessions having verification requirements overlapping with the verification requirements of the verification session for which the v-token was generated.

19. The system of claim 16, wherein the holder entity communicates with the verifier entity via a user interface of the verifier entity that includes an element that is selectable to submit the verification request.

20. The system of claim 16, wherein the one or more holder credentials of the holder entity are received from at least one issuer entity, and wherein a holder service included in an identity service of the system and utilized by the holder entity receives the one or more holder credentials by:
  causing, by the holder service via a user interface of a holder device of the holder entity, display of a scannable code;
  in response to the scannable code being scanned by an issuer device of the issuer entity, establishing, by the identity service, a secure connection between the holder device and the issuer device, wherein the secure connection is a pairwise DID; and
  causing, by an issuer service, transmission of at least one of the one or more holder credentials from the issuer device to the holder device via the secure connection.

* * * * *